United States Patent
Zhang et al.

(10) Patent No.: US 10,440,732 B2
(45) Date of Patent: Oct. 8, 2019

(54) METHOD AND DEVICE FOR TRANSMITTING DATA

(71) Applicant: HUAWEI TECHNOLOGIES CO., LTD., Shenzhen, Guangdong (CN)

(72) Inventors: Chaolong Zhang, Hangzhou (CN); Jian Wang, Hangzhou (CN); Yunfei Qiao, Hangzhou (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 21 days.

(21) Appl. No.: 15/914,429

(22) Filed: Mar. 7, 2018

(65) Prior Publication Data

US 2018/0199361 A1 Jul. 12, 2018

Related U.S. Application Data

(63) Continuation of application No. PCT/CN2016/098021, filed on Sep. 5, 2016.

(30) Foreign Application Priority Data

Sep. 9, 2015 (CN) .......................... 2015 1 0569921

(51) Int. Cl.
*H04W 72/12* (2009.01)
*H04W 72/02* (2009.01)
(Continued)

(52) U.S. Cl.
CPC ....... *H04W 72/1268* (2013.01); *H04L 5/0033* (2013.01); *H04L 5/0048* (2013.01);
(Continued)

(58) Field of Classification Search
CPC combination set(s) only.
See application file for complete search history.

(56) References Cited

U.S. PATENT DOCUMENTS

| 8,797,973 B2 * | 8/2014 | Kim | H04W 74/002 370/329 |
| 2009/0016249 A1 * | 1/2009 | Li | H04J 3/0638 370/310.1 |

(Continued)

FOREIGN PATENT DOCUMENTS

| CN | 101141788 A | 3/2008 |
| CN | 101689949 A | 3/2010 |

(Continued)

OTHER PUBLICATIONS

"3GPP TR 23.887 V12.0.0 3rd Generation Partnership Project-;Technical Specification Group Services and System Aspects;Study on Machine-Type Communications (MTC) and other mobile data applications communications enhancements(Release 12), Technical Report, Dec. 2013, 151 pages".

(Continued)

*Primary Examiner* — Mewale A Ambaye
(74) *Attorney, Agent, or Firm* — Womble Bond Dickinson (US) LLP

(57) ABSTRACT

The invention discloses a data transmission method and apparatus. The method determines a target CTU from multiple candidate CTUs according to a first partial identifier in a terminal device identifier, where the terminal device identifier includes the first partial identifier and a second partial identifier. The method sends an uplink data packet to a network device by using the target CTU, where the uplink data packet carries the second partial identifier. According to the data transmission method and apparatus disclosed, the first partial identifier in the terminal device identifier can be implicitly indicated to reduce signaling overheads of a system.

16 Claims, 9 Drawing Sheets

(51) Int. Cl.
    *H04W 72/04*     (2009.01)
    *H04L 5/00*     (2006.01)
    *H04W 74/08*     (2009.01)
    *H04W 74/00*     (2009.01)
    *H04W 4/70*     (2018.01)

(52) U.S. Cl.
    CPC ............ *H04W 4/70* (2018.02); *H04W 72/02* (2013.01); *H04W 72/042* (2013.01); *H04W 74/00* (2013.01); *H04W 74/08* (2013.01); *H04W 74/0825* (2013.01)

(56) References Cited

U.S. PATENT DOCUMENTS

| | | | |
|---|---|---|---|
| 2014/0098807 A1 | 4/2014 | Li et al. | |
| 2014/0254544 A1* | 9/2014 | Kar Kin Au | H04L 5/0033 370/330 |
| 2014/0328256 A1* | 11/2014 | Djukic | H04W 72/0413 370/329 |
| 2017/0347246 A1* | 11/2017 | Baek | H04W 4/70 |

FOREIGN PATENT DOCUMENTS

| | | |
|---|---|---|
| CN | 102487548 A | 6/2012 |
| EP | 2015485 A1 | 1/2009 |
| EP | 2846573 A1 | 3/2015 |
| WO | 2003085874 A1 | 10/2003 |
| WO | 2013050037 A1 | 4/2013 |
| WO | 2015105846 A1 | 7/2015 |

OTHER PUBLICATIONS

"3GPP TR 23.888 V11.0.0 3rd Generation Partnership Project-;Technical Specification Group Services and System Aspects-;System improvements for Machine-Type Communications (MTC)(Release 11),Technical Report, Sep. 2012, 165 pages".

"3GPP TS 36.213 V12.6.0 3rd Generation Partnership Project-;Technical Specification Group Radio Access Network; Evolved Universal Terrestrial Radio Access (E-UTRA);Physical layer procedures(Release 12), Technical Specification, Jun. 2015, 241 pages".

\* cited by examiner

METHOD AND DEVICE FOR TRANSMITTING DATA

CROSS-REFERENCE TO RELATED APPLICATIONS

This application is a continuation of International Patent Application PCT/CN2016/098021, filed on Sep. 5, 2016, which claims priority to China Patent Application No. 201510569921.4, filed on Sep. 9, 2015, the disclosures of which are incorporated herein by reference.

TECHNICAL FIELD

Embodiments of the present invention relate to the communications field, and more specifically, to a data transmission method and apparatus.

BACKGROUND

In an existing communications system (for example, a Long Term Evolution system), a terminal device sends uplink data based on a scheduling request mechanism shown in FIG. 1. When determining that there is uplink data to be sent, the terminal device may send an uplink scheduling request to a network device. The uplink scheduling request carries identification information (for example, a cell radio network temporary identity, or C-RNTI) of the terminal device. After receiving the uplink scheduling request, the network device may allocate an uplink transmission resource to the terminal device according to current system resource usage, and send an uplink grant (or UL grant) to the terminal device. The terminal device may send the uplink data to the network device on a transmission resource indicated by the uplink grant. As such, the network device may receive, on the corresponding transmission resource, the uplink data sent by the terminal device.

With the development of the Internet of Things (IoT), an increasing quantity of machine type communication (MTC) services emerge. Generally, a data packet transmitted in an MTC service is relatively small, and a transmission latency is also required to be small. When there is a large quantity of MTC services, the foregoing scheduling request mechanism not only brings a large quantity of signaling overheads, but also increases the transmission latency.

To resolve the foregoing problem, grant-free transmission has been proposed. Grant-free transmission means that a terminal device directly transmits uplink data to a network device without needing to request, in a scheduling request manner, a base station to allocate a transmission resource. In this case, the terminal device does not send an uplink scheduling request to the network device before sending the uplink data, and the network device therefore does not send a grant to or allocate a resource to the terminal device. Instead, the network device decodes the received uplink data in a blind detection manner. Therefore, the network device does not know which terminal device sends the detected uplink data.

Based on the foregoing problem, in grant-free transmission, the terminal device needs to add an identifier of the terminal device to an uplink data packet sent to the network device. However, in a scenario (e.g., IoT scenario) of massive accesses to a single cell in the future, there may be a large quantity of terminal devices, and the terminal device identifier used to identify each terminal device may be quite lengthy. For example, to support 300,000 terminal devices in a single cell, a terminal device identifier needs to be at least 19 bits long. However, a data packet transmitted by a terminal device in this scenario may be relatively small. For example, a data packet in the IoT scenario is generally 100 bits to 1,000 bits long. In this case, if a terminal device identifier is carried in the data packet, a proportion of resources occupied by the 19-bit terminal device identifier in the entire data packet is approximately up to 16%. If the terminal device divides the data packet into smaller data packets for multiple transmissions, the proportion of resources occupied by the terminal device identifier becomes higher.

SUMMARY

Embodiments of the present invention provide a data transmission method and apparatus, so as to reduce signaling overheads caused by adding a terminal device identifier to a data packet.

According to a first aspect, a data transmission method is provided. The method determines a target contention transmission unit (CTU) from multiple candidate CTUs according to a first partial identifier in a terminal device identifier, where the terminal device identifier includes the first partial identifier and a second partial identifier. The method sends an uplink data packet to a network device by using the target CTU, where the uplink data packet carries the second partial identifier.

In one aspect of the invention, to determine a target CTU from multiple candidate CTUs according to a first partial identifier in a terminal device identifier, the method determines a target CTU group from multiple candidate CTU groups according to the first partial identifier, where each of the multiple candidate CTU groups includes at least one of the multiple candidate CTUs. The method determines the target CTU from at least one candidate CTU included in the target CTU group.

In another aspect of the invention, prior to determining a target CTU group from multiple candidate CTU groups, the method changes initial numbers of the multiple candidate CTU groups according to a number of a contention access period in which the multiple candidate CTU groups belong to obtain new numbers of the multiple candidate CTU groups. To determine a target CTU group from multiple candidate CTU groups according to the first partial identifier, the method determines, according to the first partial identifier, a target CTU group number from multiple CTU group numbers corresponding to the multiple candidate CTU groups. The method determines, from the multiple candidate CTU groups, a candidate CTU group whose new number is the target CTU group number as the target CTU group.

In yet another aspect of the invention, a quantity of the multiple candidate CTU groups is $2^N$, where N is greater than or equal to 1. There is a one-to-one correspondence between $2^N$ CTU group numbers of the multiple candidate CTU groups and $2^N$ binary sequences with a length of N.

In still another embodiment of the invention, to determine a target CTU group from multiple candidate CTU groups according to the first partial identifier, the method determines the target CTU group from the multiple candidate CTU groups according to the first partial identifier and the number of the contention access period in which the multiple candidate CTU groups belong.

In another embodiment of the invention, to determine the target CTU group from the multiple candidate CTU groups according to the first partial identifier and the number of the contention access period in which the multiple candidate CTU groups belong, the method generates a binary pseudo-random sequence according to the number of the contention access period, where a length of the binary pseudo-random sequence is the same as a length of the partial identifier. The method performs a reversible operation on the binary pseudo-random sequence and the first partial identifier to obtain a first binary sequence. The method determines the target CTU group from the multiple candidate CTU groups according to the first binary sequence.

In yet another embodiment of the invention, prior to determining a target CTU group from multiple candidate CTU groups, the method divides the terminal device identifier into the first partial identifier and the second partial identifier according to a number of a contention access period in which the multiple candidate CTUs belong.

In still another embodiment of the invention, to divide the terminal device identifier into the first partial identifier and the second partial identifier according to a number of a contention access period in which the multiple candidate CTUs belong, the method generates a second binary sequence with a length of M according to the number of the contention access period, where the second binary sequence includes N reference bits with a value of 1, M is a length of the terminal device identifier, N is the length of the first partial identifier, and $1 \leq N < M$. The method sequentially arranges N bits in the terminal device identifier whose positions are respectively corresponding to the N reference bits to form the first partial identifier. The method sequentially arranges (M−N) bits in the terminal device identifier other than the N bits to form the second partial identifier.

In another aspect of the invention, to send an uplink data packet to a network device by using the target CTU, the method sends, by using the target CTU, the uplink data packet to the network device in a grant-free transmission mode.

According to a second aspect, another data transmission method is provided. The method receives an uplink data packet transmitted by a terminal device by using a target CTU, where the uplink data packet carries a second partial identifier in a terminal device identifier of the terminal device. The method determines a first partial identifier in the terminal device identifier according to the target CTU, where the terminal device identifier includes the first partial identifier and the second partial identifier. The method determines the terminal device identifier of the terminal device according to the first partial identifier and the second partial identifier.

In one aspect of the invention, to determine a first partial identifier in the terminal device identifier according to the target CTU, the method determines, according to CTU group information, a target CTU group in which the target CTU belongs. The method determines the first partial identifier according to the target CTU group.

In another aspect of the invention, to determine the first partial identifier according to the target CTU group, the method changes an initial number of the target CTU group to obtain a new number of the target CTU group. The method determines the first partial identifier according to the new number of the target CTU group.

In yet another aspect of the invention, to determine the first partial identifier according to the target CTU group, the method determines the first partial identifier according to the target CTU group and a number of a contention access period in which the target CTU belongs.

In still another aspect of the invention, to determine the first partial identifier according to the target CTU group and a number of a contention access period in which the target CTU belongs, the method determines, according to a correspondence between a CTU group number and a binary sequence with a length of N, a first binary sequence corresponding to the target CTU group, where N>1. The method generates a binary pseudo-random sequence with a length of N according to the number of the contention access period. The method performs a reversible operation on the first binary sequence and the binary pseudo-random sequence to obtain the first partial identifier.

In another aspect of the invention, to determine the terminal device identifier of the terminal device according to the first partial identifier and the second partial identifier, the method sequentially combines the first partial identifier and the second partial identifier to obtain the terminal device identifier of the terminal device.

In yet another aspect of the invention, a length of the terminal device identifier is M, and a length of the first partial identifier is N, where $1 \leq N < M$. To determine the terminal device identifier of the terminal device according to the first partial identifier and the second partial identifier, the method generates a binary random sequence with a length of M according to the number of the contention access period in which the target CTU belongs, where the binary random sequence includes N reference bits with a value of 1. The method inserts the first partial identifier into the second partial identifier to obtain the terminal device identifier, so that positions of N bits in the first partial identifier in the terminal device identifier are in a one-to-one correspondence with positions of the N reference bits in the binary random sequence.

In still another aspect of the invention, to receive an uplink data packet transmitted by a terminal device by using a target CTU, the method receives the uplink data packet transmitted by the terminal device in a grant-free transmission mode by using the target CTU.

According to a third aspect, a data transmission apparatus is provided. The apparatus includes a determining unit configured to determine a target CTU from multiple candidate CTUs according to a first partial identifier in a terminal device identifier, where the terminal device identifier includes the first partial identifier and a second partial identifier. The apparatus includes a sending unit configured to send an uplink data packet to a network device by using the target CTU determined by the determining unit, where the uplink data packet carries the second partial identifier.

In one aspect of the invention, the determining unit includes a first determining subunit configured to determine a target CTU group from multiple candidate CTU groups according to the first partial identifier, where each of the multiple candidate CTU groups includes at least one of the multiple candidate CTUs. The determining unit includes a second determining subunit configured to determine the target CTU from at least one candidate CTU included in the target CTU group determined by the first determining subunit.

In another aspect of the invention, the apparatus further includes a number changing unit configured to: before the first determining subunit determines the target CTU group from the multiple candidate CTU groups, change initial numbers of the multiple candidate CTU groups according to a number of a contention access period in which the multiple candidate CTU groups belong to obtain new numbers of the multiple candidate CTU groups, where the first determining subunit is configured to: determine, according to the first partial identifier, a target CTU group number from multiple CTU group numbers corresponding to the multiple candidate CTU groups, and determine, from the multiple candidate CTU groups, a candidate CTU group whose new number is the target CTU group number as the target CTU group.

In yet another aspect of the invention, a quantity of the multiple candidate CTU groups is $2^N$, where N≥1. There is a one-to-one correspondence between $2^N$ CTU group numbers of the multiple candidate CTU groups and $2^N$ binary sequences with a length of N.

In still another aspect of the invention, the first determining subunit is configured to determine the target CTU group from the multiple candidate CTU groups according to the first partial identifier and the number of the contention access period in which the multiple candidate CTU groups belong.

In another aspect of the invention, the first determining subunit is configured to: generate a binary pseudo-random sequence according to the number of the contention access period, where a length of the binary pseudo-random sequence is the same as a length of the first partial identifier, perform a reversible operation on the binary pseudo-random sequence and the first partial identifier to obtain a first binary sequence, and determine the target CTU group from the multiple candidate CTU groups according to the first binary sequence.

In yet another aspect of the invention, the apparatus further includes an identifier dividing unit configured to: before the determining unit determines the target CTU from the multiple candidate CTUs, divide the terminal device identifier into the first partial identifier and the second partial identifier according to a number of a contention access period in which the multiple candidate CTUs belong.

In still another aspect of the invention, the identifier dividing unit is configured to: generate a second binary sequence with a length is M according to the number of the contention access period, where the second binary sequence includes N reference bits with a value of 1, M is a length of the terminal device identifier, N is the length of the first partial identifier, and 1≤N<M, sequentially arrange N bits in the terminal device identifier whose positions are respectively corresponding to the N reference bits to form the first partial identifier, and sequentially arrange (M−N) bits in the terminal device identifier other than the N bits, to form the second partial identifier.

In another aspect of the invention, the sending unit is configured to send, by using the target CTU determined by the determining unit, the uplink data packet to the network device in a grant-free transmission mode.

In yet another aspect of the invention, the apparatus is a terminal device.

According to a fourth aspect, another data transmission apparatus is provided. The apparatus includes a receiving unit configured to receive an uplink data packet transmitted by a terminal device by using a target contention transmission unit CTU, where the uplink data packet carries a second partial identifier in a terminal device identifier of the terminal device, a first determining unit configured to determine a first partial identifier in the terminal device identifier according to the target CTU, where the terminal device identifier includes the first partial identifier and the second partial identifier, and a second determining unit configured to determine the terminal device identifier of the terminal device according to the first partial identifier determined by the first determining unit and the second partial identifier.

In one aspect of the invention, the first determining unit comprises: a first determining subunit configured to determine, according to CTU group information, a target CTU group in which the target CTU belongs, and a second determining subunit configured to determine the first partial identifier according to the target CTU group determined by the first determining subunit.

In another aspect of the invention, the second determining subunit is configured to: change an initial number of the target CTU group to obtain a new number of the target CTU group, and determine the first partial identifier according to the new number of the target CTU group.

In yet another aspect of the invention, the second determining subunit is configured to determine the first partial identifier according to the target CTU group and a number of a contention access period in which the target CTU belongs.

In still another aspect of the invention, the second determining subunit is configured to: determine, according to a correspondence between a CTU group number and a binary sequence with a length of N, a first binary sequence corresponding to the target CTU group, where N>1, generate a binary pseudo-random sequence with a length of N according to the number of the contention access period, and perform a reversible operation on the first binary sequence and the binary pseudo-random sequence to obtain the first partial identifier.

In another aspect of the invention, the second determining unit is configured to sequentially combine the first partial identifier and the second partial identifier to obtain the terminal device identifier of the terminal device.

In yet another aspect of the invention, a length of the terminal device identifier is M, and a length of the first partial identifier is N, where 1≤N<M. The second determining unit is configured to: generate a binary random sequence with a length of M according to the number of the contention access period in which the target CTU belongs, where the binary random sequence includes N reference bits with a value of 1, and insert the first partial identifier into the second partial identifier to obtain the terminal device identifier, so that positions of N bits in the first partial identifier in the terminal device identifier are in a one-to-one correspondence with positions of the N reference bits in the binary random sequence.

In still another aspect of the invention, the receiving unit is configured to receive the uplink data packet transmitted by the terminal device in a grant-free transmission mode by using the target CTU.

In another aspect of the invention, the apparatus is a network device.

Based on the foregoing aspects of the invention, according to the data transmission methods and apparatuses provided in the embodiments of the present invention, the terminal device identifier is divided into the first partial identifier and the second partial identifier, the target CTU is determined from the multiple candidate CTUs according to the first partial identifier, and the uplink data packet carrying the second partial identifier is sent by using the target CTU, so that the first partial identifier in the terminal device identifier can be implicitly indicated. Compared with that the uplink data packet carries the complete terminal device identifier, aspects of the invention can reduce system signaling overheads and improve system performance.

BRIEF DESCRIPTION OF DRAWINGS

To describe the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the invention.

An existing cellular communications system, such as a Global System for Mobile Communications (GSM), a Code Division Multiple Access (CDMA) system, a Wideband Code Division Multiple Access (WCDMA) system, and a Long Term Evolution (LTE) system, mainly supports voice and data communication. Generally, a quantity of connections supported by a conventional base station is limited and easy to implement.

A next-generation mobile communications system not only supports conventional communication, but also supports machine to machine (M2M) communication, which is also referred to as machine type communication (MTC). As predicted, by 2020, there will be 50 billion to 100 billion MTC devices connected over a network. This greatly exceeds a current quantity of connections. M2M services are diverse in service types, and different types of M2M services have quite different network requirements. In general, there are several requirements as follows: (I) reliable latency-insensitive transmission; and (II) ultra-reliable and low latency transmission.

A service requiring reliable latency-insensitive transmission is relatively easy to deal with. However, a service requiring ultra-reliable and low latency transmission, such as a vehicle-to-vehicle (V2V) service, not only requires a low transmission latency but also requires reliable transmission. If transmission is unreliable, retransmission is caused. As a result, a transmission latency is excessively high, and requirements cannot be met.

Due to the existence of a large quantity of connections, there is a significant difference between a future wireless communications system and an existing communications system. Because of the large quantity of connections, more resources need to be consumed for terminal device access, and more resources need to be consumed for data transmission of a terminal device and transmission of related scheduling signaling.

Figure 1:
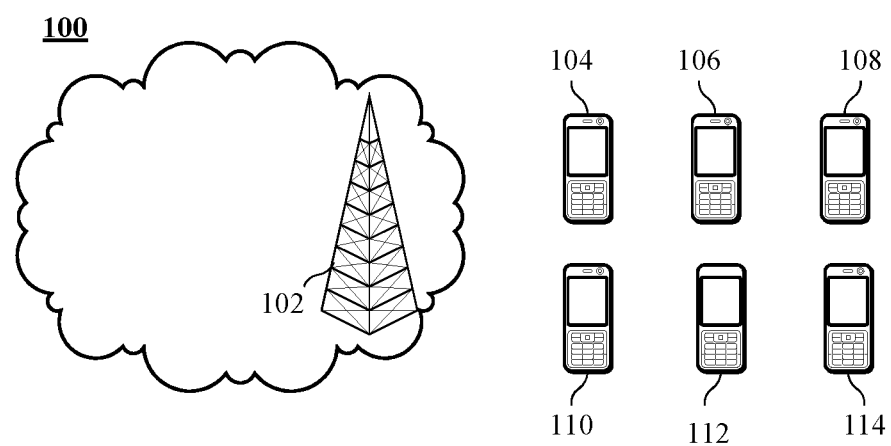
FIG. 1 is a schematic diagram of an example of a communications system in which an embodiment of the invention is applied.

FIG. 1 is a schematic architecture diagram of a system 100 in which an embodiment of the present invention can be applied. The system 100 includes a network device 102 and multiple terminal devices 104 to 114 located within a coverage area of the network device 102. The network device 102 may be connected to the multiple terminal devices in a wireless manner, a wired manner, or another manner, and the network device 102 may support simultaneous transmission on multiple cellular carriers. FIG. 1 shows an example in which there is one network device and six terminal devices. In one embodiment, the system 100 may include multiple network devices, and a number of terminal devices may be included within a coverage area of each network device. This is not limited in this embodiment of the present invention.

A network in this embodiment of the present invention may be a public land mobile network (PLMN), a device-to-device (D2D) network, an M2M network, or another network. FIG. 1 is merely an example of a simplified schematic diagram. The network may further include another network device that is not shown in FIG. 1.

In this embodiment of the present invention, the terminal device may be an access terminal, user equipment (UE), a subscriber unit, a subscriber station, a mobile station, a remote station, a remote terminal, a mobile device, a user terminal, a terminal, a wireless communications device, a user agent, or a user apparatus. The access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a future 5G network, a terminal device in a future evolved PLMN, or the like.

In this embodiment of the present invention, the network device may be a device configured to communicate with a terminal device. The network device may be a base transceiver station (BTS) in a GSM system or a CDMA system, a NodeB (NB) in a WCDMA system, an evolved NodeB (also referred to as eNB or eNodeB) in an LTE system, or an access controller in a cloud radio access network (CRAN). Alternatively, the network device may be a relay node, an access point, an in-vehicle device, a wearable device, a network-side device in a future 5G network, a network device in a future evolved PLMN network, or the like.

To deal with a large quantity of MTC services in a future network and to satisfy ultra-reliable and low latency service transmission, the network device 102 in the system 100 may use a grant-free transmission solution. This solution may be applicable to uplink data transmission. In this grant-free transmission mechanism, a terminal device does not need to request, in a scheduling request manner, a network device to allocate a transmission resource, but directly contends for a resource and transmits uplink data, so as to reduce system signaling overheads and a transmission latency.

Grant-free transmission may be understood as one or more of the following meanings, or a combination of some technical features in multiple meanings.

1. Grant-free transmission may mean: A network device pre-allocates multiple transmission resources to a terminal device and notifies the terminal device of the multiple transmission resources. When the terminal device has an uplink data transmission requirement, the terminal device selects at least one transmission resource from the multiple transmission resources pre-allocated by the network device, and sends uplink data by using the selected transmission resource. The network device detects, on at least one of the pre-allocated multiple transmission resources, the uplink data sent by the terminal device. The detection may be a blind detection, detection performed according to a control field in the uplink data, or detection performed in another suitable manner.

The blind detection may be understood as detection performed, when it is unknown in advance whether data arrives, on data that may arrive. The blind detection may also be understood as detection performed without an explicit signaling indication.

2. Grant-free transmission may mean: A network device pre-allocates multiple transmission resources to a terminal device and notifies the terminal device of the multiple transmission resources, so that when the terminal device has an uplink data transmission requirement, the terminal device selects at least one transmission resource from the multiple transmission resources pre-allocated by the network device, and sends uplink data by using the selected transmission resource.

3. Grant-free transmission may mean: A terminal device obtains information about multiple pre-allocated transmission resources. When the terminal device has an uplink data transmission requirement, the terminal device selects at least one transmission resource from the multiple transmission resources, and sends uplink data by using the selected transmission resource. The terminal device may obtain the information about the multiple transmission resources in multiple manners. For example, a mapping relationship between a terminal device and a transmission resource may be defined in a protocol, or indicated by a network device by using an instruction.

4. Grant-free transmission may mean a method for transmitting uplink data by a terminal device without dynamic scheduling performed by a network device. The dynamic scheduling may be a scheduling manner in which the network device needs to indicate, by using signaling, a transmission resource for each uplink data transmission of the terminal device. In one embodiment, the transmission resource may be a transmission resource in one or more transmission time units following a moment in which the terminal device receives the signaling. One transmission time unit may be a smallest time unit for one transmission, for example, a transmission time interval (TTI), and its value may be 1 millisecond (ms). Alternatively, one transmission time unit may be a preset transmission time unit. In one embodiment, implementing uplink data transmission performed by a terminal device may be understood as follows: At least two terminal devices are allowed to perform uplink data transmission on a same time-frequency resource.

5. Grant-free transmission may mean: A terminal device performs uplink data transmission without a grant from a network device. The grant may mean: The terminal device sends an uplink scheduling request to the network device, and after receiving the scheduling request, the network device sends an uplink grant to the terminal device. The uplink grant is used to indicate an uplink transmission resource allocated to the terminal device.

6. Grant-free transmission may mean a contention transmission mode, and may specifically mean: Multiple terminal devices perform uplink data transmission on a same pre-allocated time-frequency resource simultaneously without a grant from a network device.

In one embodiment, the data may be service data or signaling data.

In the grant-free transmission mechanism, the transmission resource may include but is not limited to one or a combination of the following resources: a time-domain resource (e.g., a radio frame, a subframe, or a symbol), a frequency-domain resource (e.g., a subcarrier or a resource block), a space-domain resource (e.g., a transmit antenna or a beam), a code-domain resource (e.g., a sparse code multiple access or SCMA codebook, a low density signature or LDS, or a CDMA code), or an uplink pilot resource.

The foregoing transmission resources may be used for transmission performed according to a control mechanism including but not limited to the following: uplink power control such as uplink transmit power upper limit control, modulation and coding scheme setting such as transport block size setting, bit rate setting, and modulation order setting, and a retransmission mechanism such as a hybrid automatic repeat request (HARQ) mechanism.

In the grant-free transmission mechanism, at least one contention access region (CAR) is defined in a time-frequency domain. The CAR may be a time-frequency region used for grant-free transmission, different CARs may be respectively corresponding to different time-frequency resources, and each CAR may further include at least one contention transmission unit (CTU). The CAR may also be referred to as a CTU access region or a time-frequency resource corresponding to a CTU. A CTU may be a basic transmission resource unit for grant-free transmission. The CTU may be a combination of at least one of a time resource, a frequency resource, a code domain resource, or a pilot resource. For example, the CTU may be a transmission resource combining a time resource, a frequency resource, and a code domain resource, may be a transmission resource combining a time resource, a frequency resource, and a pilot resource, or may be a transmission resource combining a time resource, a frequency resource, a code domain resource, and a pilot resource. However, this is not limited in this embodiment of the present invention.

The grant-free transmission for example is provided in a patent application numbered PCT/CN2014/073084, entitled "System and Method for Uplink Grant-free Transmission Scheme", the disclosure of which is incorporated herein by reference. In this patent application, a transmission resource may be divided into different CTUs. One code group may be allocated to each CTU. The allocated code group may be a group of CDMA codes, an SCMA codebook set, an LDS, a signature, or the like. In one embodiment, each code may be corresponding to a group of pilots.

After accessing the network device 102, the terminal devices 104 to 114 may report their own capability information to the network device 102. The capability information may include information used to indicate whether the terminal devices 104 to 114 are capable of grant-free transmission. This way, the network device 102 may use, according to capability information reported by each terminal device, a grant-free transmission mechanism or a conventional request-grant mechanism to communicate with the terminal device. In one embodiment, the network device 102 may notify the terminal device of required information for performing grant-free transmission. For example, the network device 102 may instruct the terminal device to perform grant-free transmission, and send search space information, CAR information, CTU information, modulation and coding scheme information, and the like to the terminal device. Each terminal device is mapped to one or more CTUs, and a mapping rule may be predefined, or set by the network device 102. The terminal device may select one code and one pilot in a pilot group corresponding to the code to perform uplink transmission. However, this is not limited in this embodiment of the present invention.

Figure 2:
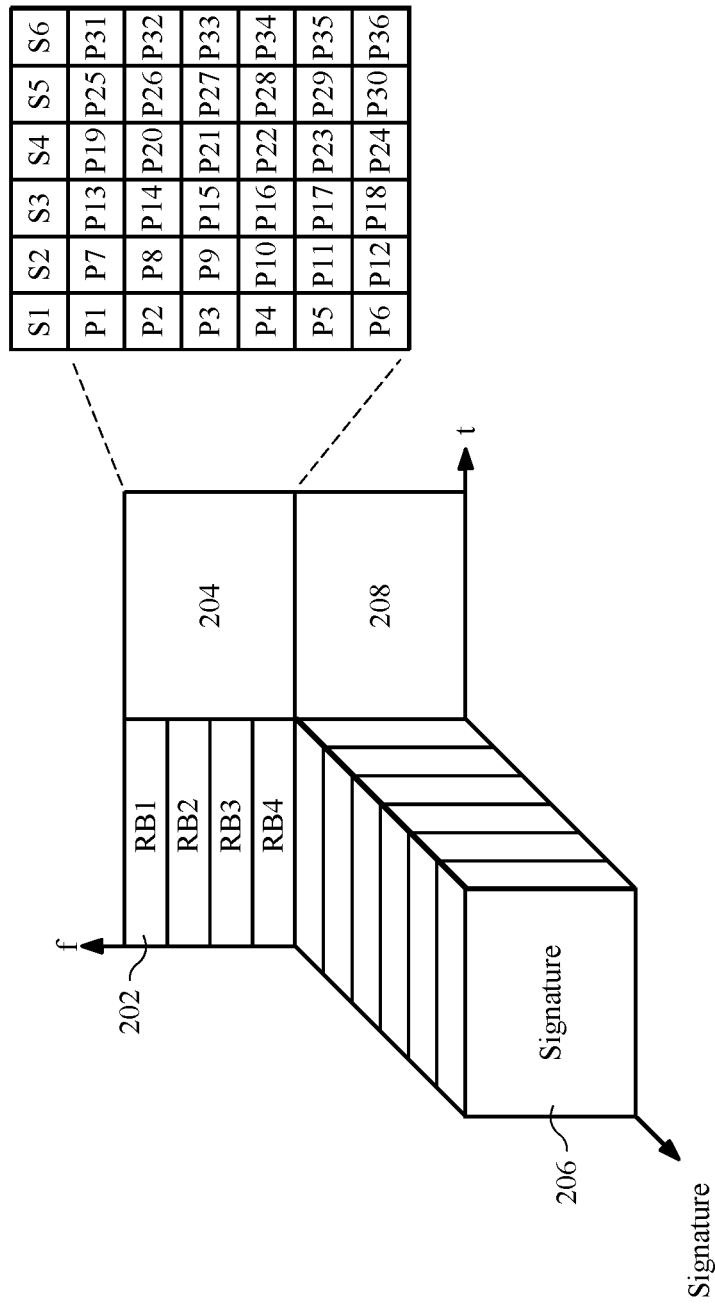
FIG. 2 is a schematic diagram of a contention access region and a contention transmission unit in the communications system shown in FIG. 1.

FIG. 2 shows an example of a CAR and a CTU in a grant-free transmission mechanism. An available bandwidth of a system is divided into multiple different time-frequency regions. Each CAR occupies different resource blocks. In one embodiment, a quantity of resource blocks occupied by each CAR may be predefined. For example, a CAR 202 occupies resource blocks (RB) 1 to 4 of a frequency band. As shown in FIG. 2, each CAR may be further divided into at least one CTU, and each CTU is a combination of a specific time, a frequency, a signature, and a pilot. In FIG. 2, all CARs are corresponding to a same CTU mapping relationship. For ease of description, a mapping relationship of four CARs (e.g., CARs 202-208) is shown from different perspectives. However, this is not limited in this embodiment of the present invention. As shown in FIG. 2, each CAR supports six signatures (S1 to S6), and each signature may be corresponding to six pilots. Therefore, there are a total of 36 pilots (P1 to P36) that are corresponding to 36 CTUs. However, this is not limited in this embodiment of the present invention.

It should be understood that FIG. 2 shows an example in which there are four CARs and each CAR includes 36 CTUs, but another quantity of CARs may be included in this embodiment of the present invention, and each CAR may include another quantity of CTUs. This is not limited in this embodiment of the present invention.

Figure 3:
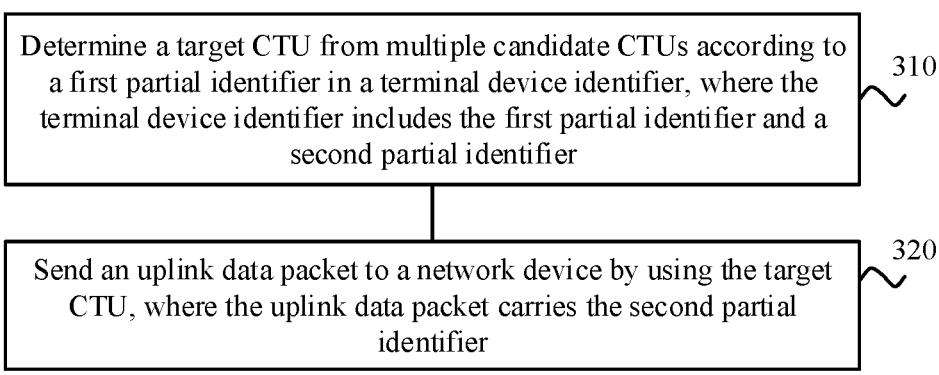
FIG. 3 is a schematic flowchart of a data transmission method according to an embodiment of the invention.

FIG. 3 shows a data transmission method 300 according to an embodiment of the present invention. The method 300 may be executed by a terminal device (e.g., any terminal device 104-114 of FIG. 1).

At 310, the method determines a target CTU from multiple candidate CTUs according to a first partial identifier in a terminal device identifier, where the terminal device identifier includes the first partial identifier and a second partial identifier.

In one embodiment, the terminal device identifier is used to identify the terminal device in a network, so that a network device (e.g., network device 102 of FIG. 1) can distinguish the terminal device from another terminal device. In one embodiment, the terminal device identifier may be specifically a cell radio network temporary identity (C-RNTI), a user identity, a device identifier, or the like. This is not limited in this embodiment of the present invention.

In one embodiment, the terminal device may divide its terminal device identifier with a length of M into a first partial identifier with a length of N and a second partial identifier with a length of (M−N), where N≥1 and M≥N. The second partial identifier is a portion explicitly reported by the terminal device to the network device, and the first partial identifier is a portion implicitly indicated by the terminal device to the network device. A value of N may be predefined, indicated by the network device, or determined by the terminal device according to an actual condition. This is not limited in this embodiment of the present invention.

In one embodiment, the terminal device may divide the terminal device identifier in multiple manners. For example, the terminal device may determine the first (M−N) consecutive bits in the terminal device identifier as the explicit portion, and determine the last N consecutive bits as the implicit portion. Alternatively, the terminal device may determine the first N consecutive bits or the middle N consecutive bits in the terminal device identifier as the implicit portion, and determine the remaining portion as the explicit portion. Alternatively, the terminal device may determine N bits in odd-number (or even-number) positions in the terminal device identifier as the implicit portion and (M−N) bits in even-number (or odd-number) positions as the explicit portion. Alternatively, the terminal device may divide the terminal device identifier in another manner. A manner in which the terminal device divides the terminal device identifier may be predefined, or indicated by the network device. This is not limited in this embodiment of the present invention.

At 320, the method sends an uplink data packet to a network device by using the target CTU, where the uplink data packet carries the second partial identifier.

Specifically, the terminal device may send the uplink data packet to the network device in a grant-free transmission mode, and the terminal device may send the uplink data packet by using the target CTU determined according to the first partial identifier, so as to implicitly indicate the first partial identifier. This way, the network device may extract the second partial identifier from the uplink data packet, determine the first partial identifier according to the target CTU, and determine, according to the first partial identifier and the second partial identifier, the complete terminal device identifier corresponding to the uplink data packet.

Therefore, according to the data transmission method provided in this embodiment of the present invention, the terminal device identifier is divided into the first partial identifier and the second partial identifier, the target CTU is determined from the multiple candidate CTUs according to the first partial identifier, and the uplink data packet carrying the second partial identifier is sent by using the target CTU, so that the first partial identifier in the terminal device identifier can be implicitly indicated. Compared with that the uplink data packet carries the complete terminal device identifier, this method can reduce system signaling overheads and improve system performance.

At 310, the multiple candidate CTUs may be specifically CTUs in one or more CARs, and the terminal device may determine one or more CTUs of the multiple candidate CTUs as the target CTU or CTUs according to a predefined rule or a rule indicated by the network device. For example, there is a correspondence between multiple CTU numbers corresponding to the multiple candidate CTUs and multiple binary sequences with a length of N, and the terminal device determines, according to the correspondence, a target CTU number corresponding to the first partial identifier or corresponding to a binary sequence obtained from the first partial identifier, and determines a target CTU corresponding to the target CTU number. In one embodiment, the terminal device may determine, according to a size of the uplink data packet, a quantity of candidate CTUs that may be used as the target CTU. However, this is not limited in this embodiment of the present invention.

In this embodiment of the present invention, the multiple candidate CTUs may be classified into groups. Each CTU group may include one or more candidate CTUs, and quantities of candidate CTUs included in different CTU groups may be different or the same. A grouping status of the multiple candidate CTUs may be predefined, or preconfigured by the network device and notified to the terminal device. This is not limited in this embodiment of the present invention.

In one embodiment, prior to 310, the method 300 further receives indication information sent by the network device, where the indication instruction is used to indicate group information of the multiple candidate CTUs, and determines, according to the indication information, CTU groups in which the multiple candidate CTUs respectively belong to.

Specifically, the terminal device may determine a quantity of multiple candidate CTU groups into which the multiple candidate CTUs are grouped and numbers of the multiple candidate CTU groups, and determine one or more candidate CTUs included in each candidate CTU group. However, this is not limited in this embodiment of the present invention.

Figure 4:
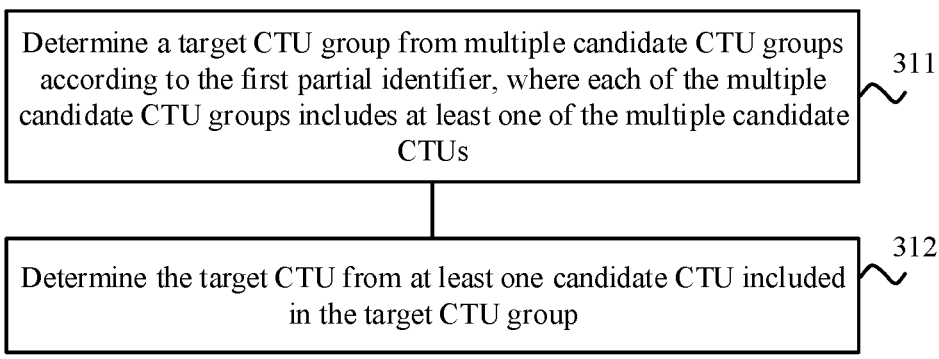
FIG. 4 is another schematic flowchart of a data transmission method according to an embodiment of the invention.

In one embodiment, as shown in FIG. 4, in determining a target CTU from multiple candidate CTUs according to a first partial identifier in a terminal device identifier, the method at 311 determines a target CTU group from multiple candidate CTU groups according to the first partial identifier, where each of the multiple candidate CTU groups includes at least one of the multiple candidate CTUs.

At 312, the method determines the target CTU from at least one candidate CTU included in the target CTU group.

Specifically, the terminal device may determine at least one of the multiple candidate CTU groups as the target CTU group according to the first partial identifier, and determine some or all candidate CTUs in the target CTU group as the target CTU.

In one embodiment, a quantity of the multiple candidate CTU groups is $2^N$, and there is a one-to-one correspondence between $2^N$ CTU group numbers of the $2^N$ candidate CTU groups and $2^N$ binary sequences with a length of N.

The correspondence may be predefined or preconfigured by the network device and notified to the terminal device. For example, assuming that N=2, that the quantity of the multiple candidate CTU groups is four, and that numbers of the multiple candidate CTU groups are 1 to 4, four binary sequences 00, 01, 10, and 11 with a length of 2 bits may be corresponding to the CTU group numbers 1, 2, 3, and 4, respectively. However, this is not limited in this embodiment of the present invention.

In one embodiment, at 311, the terminal device may determine, from the multiple candidate CTU groups according to the correspondence, a target CTU group whose number is corresponding to the first partial identifier. However, this is not limited in this embodiment of the present invention.

In one embodiment, the terminal device may determine the target CTU group according to the first partial identifier and another parameter that can be learned by both the network device and the terminal device. In this embodiment of the present invention, a time-domain resource of the system may be divided into multiple contention access periods, and each contention access period is corresponding to a phase, such as a subframe or a radio frame. In one embodiment, there may be one or more CARs in each contention access period, and there may be one or more CTUs in each CAR. Correspondingly, there may be one or more CTUs in one contention access period. A value of a contention access period and distribution of CARs and/or CTUs in each contention access period may be predefined, or configured by the network device. This is not limited in this embodiment of the present invention.

In one embodiment, the multiple candidate CTU groups are in a same contention access period. The multiple candidate CTUs may be some or all CTUs in the contention access period. This is not limited in this embodiment of the present invention. In this case, in determining a target CTU group from multiple candidate CTU groups according to the first partial identifier, the method determines the target CTU group from the multiple candidate CTU groups according to the first partial identifier and a number of the contention access period in which the multiple candidate CTU groups belong.

If the multiple candidate CTU groups are in the same contention access period, the terminal device may determine the target CTU group from the multiple candidate CTU groups according to the number of the contention access period and the first partial identifier. For example, the terminal device may determine a binary sequence with a length of N according to the number of the contention access period and the first partial identifier, and determine, according to a correspondence between the binary sequence and a CTU group number, the CTU group number corresponding to the binary sequence, so as to determine a target CTU group corresponding to the CTU group number. However, this is not limited in this embodiment of the present invention.

In one embodiment, in determining the target CTU group from the multiple candidate CTU groups according to the first partial identifier and a number of the contention access period in which the multiple candidate CTU groups belong, the method generates a binary pseudo-random sequence according to the number of the contention access period, where a length of the binary pseudo-random sequence is the same as a length of the first partial identifier, performs a reversible operation on the binary pseudo-random sequence and the first partial identifier to obtain a first binary sequence, and determines the target CTU group from the multiple candidate CTU groups according to the first binary sequence.

Specifically, the terminal device may generate the binary pseudo-random sequence by using the number of the contention access period as a seed, where the length of the binary pseudo-random sequence may be N. Then, the terminal device may perform the reversible operation on the binary pseudo-random sequence and the first partial identifier to obtain the first binary sequence. The reversible operation for example may be an exclusive OR (XOR) operation or another operation, so that the network device can obtain the first partial identifier when performing the same operation on the target CTU group and the binary pseudo-random sequence. Finally, the terminal device may determine the target CTU group according to the first binary sequence. For example, the terminal device determines, according to the correspondence between the binary sequence and the CTU group number, a target CTU group number corresponding to the first binary sequence, and further determines a target CTU group corresponding to the target CTU group number. However, this is not limited in this embodiment of the present invention. In one embodiment, the terminal device may determine, in another manner, the target CTU group from the multiple candidate CTU groups according to the binary pseudo-random sequence and the first partial identifier. This is not limited in this embodiment of the present invention.

At 312, the terminal device may determine the target CTU from the target CTU group in multiple manners. It is assumed that a quantity of candidate CTUs included in the target CTU group is L, where L≥1. In one embodiment, the terminal device may randomly select P candidate CTUs from the L candidate CTUs, and determine the P candidate CTUs as the target CTU, where 1≤P<L. This way, the target CTU group is first determined from the multiple candidate CTU groups, and then the target CTU is randomly selected from the target CTU group, so that a probability that different terminal devices select a same target CTU can be reduced, to improve data transmission performance and overall system performance.

In one embodiment, the foregoing CTU group number may be an initial number of a CTU group, that is, a predefined number or a number configured by the network device. In another embodiment, the terminal device may change initial numbers of some or all candidate CTU groups of the multiple candidate CTU groups to obtain new numbers of the multiple candidate CTU groups, and determine the target CTU group from the multiple candidate CTU groups according to the new numbers of the multiple candidate CTU groups. For example, the terminal device determines, according to the correspondence, a CTU group number corresponding to the N-bit binary sequence obtained from the first partial identifier, and determines, as the target CTU group, a CTU group whose new number is the target CTU group number. Specifically, the terminal device may randomly interchange the initial numbers of the some or all candidate CTU groups of the multiple candidate CTU groups, or may perform cyclic shift on the initial numbers of all candidate CTU groups of the multiple candidate CTU groups. For example, assuming that a quantity of the multiple candidate CTU groups is four and that initial numbers of the multiple candidate CTU groups are 1 to 4 in sequence, the terminal device may cyclically shift the initial numbers of the four candidate CTU groups as follows:

A new number of a candidate CTU group with the initial number 1 is set to 3, a new number of a candidate CTU group with the initial number 2 is set to 4, a new number of a candidate CTU group with the initial number 3 is set to 1, and a new number of a candidate CTU group with the initial number 4 is set to 2. However, this is not limited in this embodiment of the present invention.

In another embodiment, the terminal device may change numbers of some or all candidate CTU groups of the multiple candidate CTU groups according to the number of the contention access period. Correspondingly, prior to 311, the method 300 may change initial numbers of the multiple candidate CTU groups according to the number of the contention access period to obtain new numbers of the multiple candidate CTU groups.

Correspondingly, in determining a target CTU group from multiple candidate CTU groups according to the first partial identifier, the method determines, according to the first partial identifier, a target CTU group number from multiple CTU group numbers corresponding to the multiple candidate CTU groups, and determines, from the multiple candidate CTU groups, a candidate CTU group whose new number is the target CTU group number as the target CTU group.

For example, the terminal device may generate a pseudo-random number by using the number of the contention access period as a seed, and perform, by using the pseudo-random number as a unit, cyclic shift on the multiple CTU group numbers corresponding to the multiple candidate CTU groups. However, this is not limited in this embodiment of the present invention.

After determining the new numbers of the multiple candidate CTU groups, the terminal device may determine the target CTU group according to the new numbers. For example, the terminal device may determine, according to the correspondence between the binary sequence and the CTU group number, the CTU group number corresponding to the binary sequence obtained from the first partial identifier, and determine a candidate CTU group whose new number is the corresponding CTU group number as the target CTU group. However, this is not limited in this embodiment of the present invention.

This way, changing processing is performed on the initial numbers of the multiple candidate CTU groups to form new numbers, and the target CTU group is determined according to the new numbers. Accordingly, the terminal device's transmission of the uplink data by using a same target CTU group or target CTU in multiple contention access periods can be avoided, thereby improving data transmission performance.

In this embodiment of the present invention, the terminal device may determine lengths of the first partial identifier and the second partial identifier according to a quantity of multiple available candidate CTU groups or available candidate CTUs, for example, a quantity of CTU groups or CTUs included in the contention access period. In an embodiment, prior to 310, the method 300 further determines that the length of the first partial identifier is N when the quantity of the multiple candidate CTU groups is $2^N$. In some embodiments, the length of the first partial identifier may be less than N, although is not limited in this embodiment of the present invention.

In another embodiment, when determining the lengths of the first partial identifier and the second partial identifier, the terminal device may further divide the terminal device identifier according to the number of the contention access period. Correspondingly, prior to 310, the method 300 further divides the terminal device identifier into the first partial identifier and the second partial identifier according to the number of the contention access period.

This way, the terminal device may determine, according to the number of the contention access period and the quantity of the multiple candidate CTU groups, the first partial identifier and the second partial identifier in the terminal device identifier.

In one embodiment, in dividing the terminal device identifier into the first partial identifier and the second partial identifier according to the number of the contention access period, the method generates a second binary sequence with a length of M according to the number of the contention access period, where the second binary sequence includes N reference bits with a value of 1, M is a length of the terminal device identifier, N is the length of the first partial identifier, and 1≤N<M, sequentially arranges N bits in the terminal device identifier whose positions are respectively corresponding to the N reference bits to form the first partial identifier; and sequentially arranges (M−N) bits in the terminal device identifier other than the N bits, to form the second partial identifier.

Specifically, the terminal device may generate the second binary sequence with a length of M by using the number of the contention access period as a seed. The second binary sequence includes the N reference bits, and a value of each reference bit is 1. Then, the terminal device may sequentially arrange bits, in the terminal device identifier with a length of M, that are located in positions corresponding to the N reference bits to form the first partial identifier. In one embodiment, the N bits may be arranged from left to right in a positive sequence, a reverse sequence, or another suitable sequence. The sequencing manner may be predefined, or preconfigured by the network device. This is not limited in this embodiment of the present invention.

In another embodiment, the terminal device may generate, according to the number of the contention access period, a third binary sequence with a length of M and including (M–N) 1s, sequentially arrange bits in the terminal device identifier that are located in positions corresponding to (M–N) 1s to form the second partial identifier, and determine the remaining portion as the first partial identifier. However, this is not limited in this embodiment of the present invention.

Therefore, according to the data transmission method provided in this embodiment of the present invention, the terminal device identifier is divided into the first partial identifier and the second partial identifier, the target CTU is determined from the multiple candidate CTUs according to the first partial identifier, and the uplink data packet carrying the second partial identifier is sent by using the target CTU, so that the first partial identifier in the terminal device identifier can be implicitly indicated. Compared with that the uplink data packet carries the complete terminal device identifier, this method can reduce system signaling overheads and improve system performance.

In the foregoing details, with reference to FIG. 3 and FIG. 4, the data transmission method according to this embodiment of the present invention is from a perspective of a terminal device. In the following details, with reference to FIG. 5, a data transmission method according to an embodiment of the present invention is from a perspective of a network device.

Figure 5:
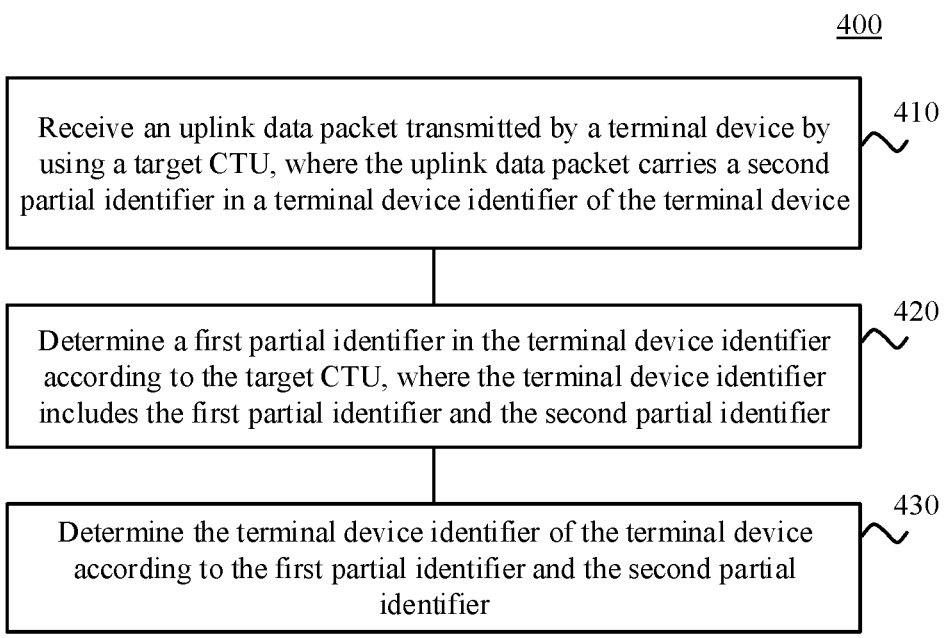
FIG. 5 is a schematic flowchart of another data transmission method according to an embodiment of the invention.

FIG. 5 shows another data transmission method 400 according to an embodiment of the present invention. The method 400 may be executed by a network device (e.g., network device 102 of FIG. 1).

At 410, the method receives an uplink data packet transmitted by a terminal device by using a target CTU, where the uplink data packet carries a second partial identifier in a terminal device identifier of the terminal device.

At 420, the method determines a first partial identifier in the terminal device identifier according to the target CTU, where the terminal device identifier includes the first partial identifier and the second partial identifier.

At 430, the method determines the terminal device identifier of the terminal device according to the first partial identifier and the second partial identifier.

In one embodiment, the terminal device may transmit the uplink data packet in a grant-free transmission mode. Correspondingly, the network device may perform blind detection, so as to detect the uplink data packet carrying the second partial identifier and transmitted by using the target CTU. The network device may determine, according to a rule the same as that used by the terminal device, the first partial identifier corresponding to the target CTU, and determine, according to the first partial identifier and the second partial identifier, the complete terminal device identifier corresponding to the uplink data packet.

Therefore, according to the data transmission method provided in this embodiment of the present invention, the terminal device identifier is divided into the first partial identifier and the second partial identifier, the target CTU is determined from the multiple candidate CTUs according to the first partial identifier, and the uplink data packet carrying the second partial identifier is sent by using the target CTU, so that the first partial identifier in the terminal device identifier can be implicitly indicated. The network device may determine the first partial identifier according to the target CTU, and further determine the complete terminal device identifier of the terminal device. Compared with that the uplink data packet carries the complete terminal device identifier, this method can reduce system signaling overheads and improve system performance.

In this embodiment of the present invention, the network device may further preconfigure at least one of the following: a grouping manner of CTUs, a CTU group number, a length of the first partial identifier, a manner of dividing the terminal device identifier, and a manner of determining a target CTU according to the first partial identifier. In addition, the network device may notify the terminal device of the configuration. However, this is not limited in this embodiment of the present invention.

In one embodiment, prior to 410, the method 400 groups, according to a current network status, multiple CTUs in a contention access period in which the target CTU belongs into multiple CTU groups, where each CTU group includes at least one of the multiple CTUs, and sends CTU group information of the contention access period to the terminal device.

The network device may group the multiple CTUs according to a length requirement for the first partial identifier and a status of the multiple CTUs in the contention access period. A specific implementation of the grouping is not limited in this embodiment of the present invention.

In another embodiment, in determining a first partial identifier in the terminal device identifier according to the target CTU, the method determines, according to CTU group information, a target CTU group in which the target CTU belongs, and determines the first partial identifier according to the target CTU group. In one embodiment, the CTU group information may be predefined or preconfigured and determined by the network device. This is not limited in this embodiment of the present invention.

In some embodiments, there may be a predefined or preconfigured correspondence between a CTU group number and a binary sequence. Correspondingly, the network device may determine, according to the correspondence, a binary sequence corresponding to a number of the target CTU group, and determine the first partial identifier according to the binary sequence. For example, the network device may directly determine the binary sequence as the first partial identifier, or process the binary sequence to obtain the first partial identifier. This is not limited in this embodiment of the present invention.

In one embodiment, in determining the first partial identifier according to the target CTU group, the method changes an initial number of the target CTU group to obtain a new number of the target CTU group, and determines the first partial identifier according to the new number of the target CTU group.

Specifically, the network device may determine, according to a correspondence between a CTU group number and a binary sequence, a binary sequence corresponding to the new number of the target CTU group, and determine the first partial identifier according to the corresponding binary sequence. However, this is not limited in this embodiment of the present invention.

In another embodiment, in determining the first partial identifier according to the target CTU group, the method determines the first partial identifier according to the target CTU group and a number of a contention access period in which the target CTU belongs.

In one embodiment, in determining the first partial identifier according to the target CTU group and a number of a contention access period in which the target CTU belongs, the method determines, according to a correspondence between a CTU group number and a binary sequence with a length of N, a first binary sequence corresponding to the target CTU group, where N>1, generates a binary pseudo-random sequence with a length of N according to the number of the contention access period, and performs a reversible operation on the first binary sequence and the binary pseudo-random sequence to obtain the first partial identifier. In one embodiment, the reversible operation may be an exclusive OR operation. However, this is not limited in this embodiment of the present invention.

In another embodiment, in determining the terminal device identifier of the terminal device according to the first partial identifier and the second partial identifier, the method sequentially combines the first partial identifier and the second partial identifier to obtain the terminal device identifier of the terminal device.

Specifically, assuming that the first partial identifier is A and the second partial identifier is B, for example, the network device may combine A and B in a specific sequence to obtain the complete terminal device identifier AB or BA corresponding to the uplink data packet. The sequence in which the network device combines the first partial identifier and the second partial identifier may be defined in a protocol, preconfigured by the network device and notified to the terminal device, or determined by the network device and the terminal device through negotiation. This is not limited in this embodiment of the present invention.

In another embodiment, at 430, the network device may further sequentially arrange, according to the number of the contention access period in which the target CTU belongs, multiple bits included in the first partial identifier and the second partial identifier to obtain the terminal device identifier of the terminal device. For example, the network device may insert at least one bit in the first partial identifier into the second partial identifier according to the number of the contention access period, to obtain the complete terminal device identifier. In a specific example, a length of the terminal device identifier is M, and a length of the first partial identifier is N, where 1≤N<M. Correspondingly, in determining the terminal device identifier of the terminal device according to the first partial identifier and the second partial identifier, the method generates a binary random sequence with a length of M according to the number of the contention access period in which the target CTU belongs, where the binary random sequence includes N reference bits with a value of 1, and inserts the first partial identifier into the second partial identifier to obtain the terminal device identifier, so that positions of N bits in the first partial identifier in the terminal device identifier are in a one-to-one correspondence with positions of the N reference bits in the binary random sequence.

A rule used by the network device to determine the first partial identifier according to the target CTU may be the same as that used by the terminal device to determine the target CTU according to the first partial identifier, and a manner in which the network device determines the terminal device identifier according to the first partial identifier and the second partial identifier may be the same as a manner in which the terminal device divides the terminal device identifier. Therefore, for details, refer to corresponding content. For brevity, details are not further described herein.

Therefore, according to the data transmission method provided in this embodiment of the present invention, the terminal device identifier is divided into the first partial identifier and the second partial identifier, the target CTU is determined from the multiple candidate CTUs according to the first partial identifier, and the uplink data packet carrying the second partial identifier is sent by using the target CTU, so that the first partial identifier in the terminal device identifier can be implicitly indicated. The network device may determine the first partial identifier according to the target CTU, and further determine the complete terminal device identifier of the terminal device. Compared with that the uplink data packet carries the complete terminal device identifier, this method can reduce system signaling overheads and improve system performance.

Figure 6:
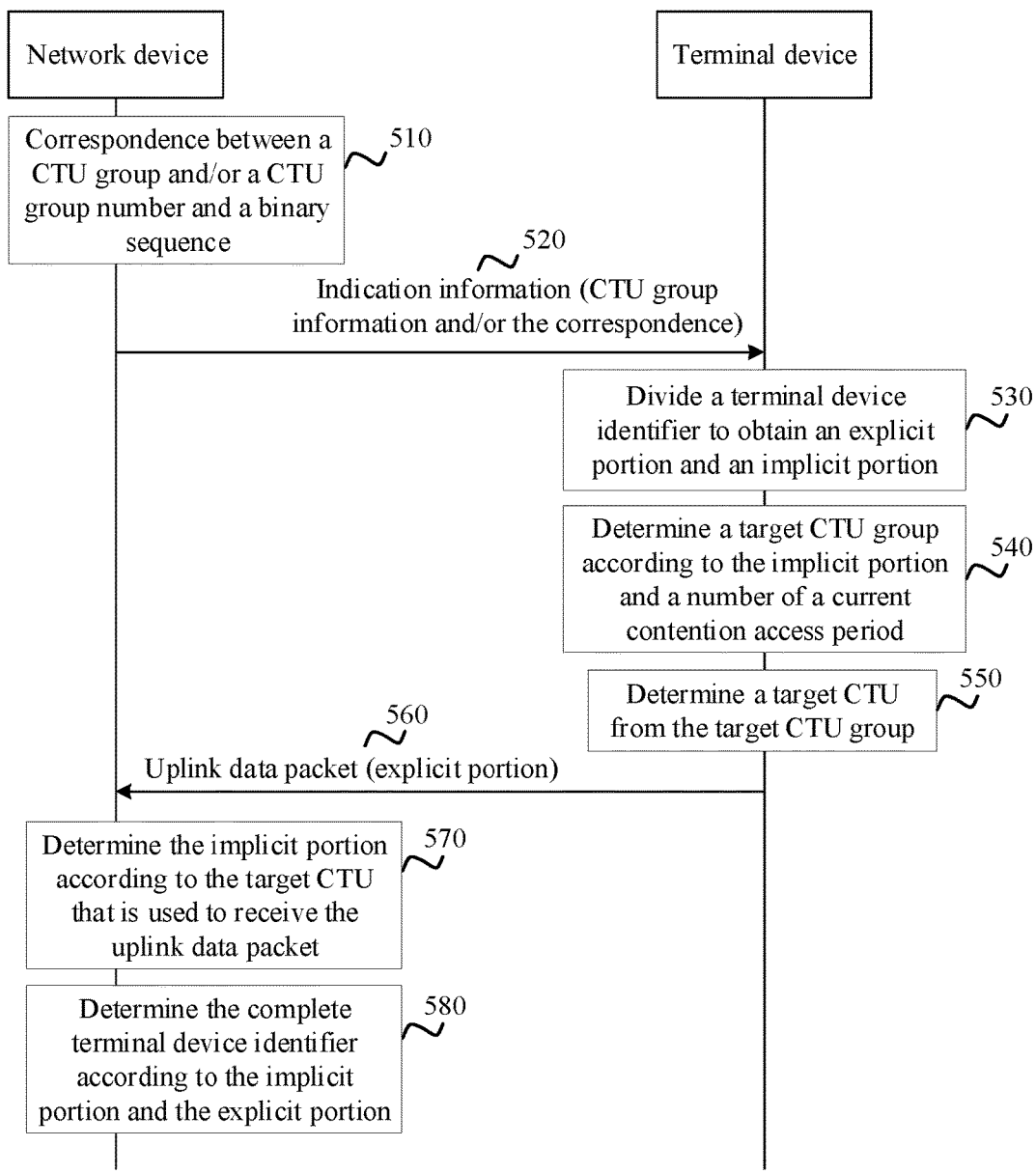
FIG. 6 is a schematic flowchart of another data transmission method according to an embodiment of the invention.

The following provides more details about the data transmission method according to this embodiment of the present invention by using specific examples. FIG. 6 is a schematic flowchart of another data transmission method 500 according to an embodiment of the present invention.

At 510, a network device groups multiple CTUs in a current contention access period into $2^N$ CTU groups, and/or determines a one-to-one correspondence between numbers of the $2^N$ CTU group and $2^N$ binary sequences with a length of N, where N>1.

At least one of a grouping status of the multiple CTUs or a correspondence between a CTU group number and a binary sequence may be determined by the network device, or may be predefined in a protocol. This is not limited in this embodiment of the present invention.

Each of the $2^N$ CTU groups may include at least one CTU, and quantities of CTUs included in different CTU groups may be different or the same. Specifically, a quantity of CTUs included in each CTU group may be related to a degree of freedom requirement for a terminal device to select a target CTU, and may be predefined, or determined by the network device independently, or determined by the network device and the terminal device through negotiation. This is not limited in this embodiment of the present invention.

In one embodiment, the network device may group CTUs in some or all contention access periods. Quantities of CTU groups in different contention access periods may be the same or different, and quantities of CTUs included in different CTU groups may be the same or different. This is not limited in this embodiment of the present invention.

In this case, the terminal device may implicitly indicate M bits in a terminal device identifier of the terminal device in the current contention access period, where 1≤M≤N.

At 520, the network device sends indication information to a terminal device, where the indication information is used to indicate CTU group information of the current contention access period and/or a correspondence between a CTU group number and a binary sequence.

In one embodiment, grouping of CTU groups in the current contention access period, a numbering rule, and the correspondence between a CTU group number and a binary sequence may be predefined. This is not limited in this embodiment of the present invention.

At 530, the terminal device divides a terminal device identifier with a length of M into an implicit portion with a length of N and an explicit portion with a length of (M−N).

In one embodiment, the terminal device may determine the first (M−N) consecutive bits in the terminal device identifier as the explicit portion, and determine the last N consecutive bits as the implicit portion. Alternatively, the terminal device may determine the first N consecutive bits or the middle N consecutive bits in the terminal device identifier as the implicit portion, and determine the remaining portion as the explicit portion. Alternatively, the terminal device may divide the terminal device identifier in another manner. A manner in which the terminal device divides the terminal device identifier may be predefined, or indicated by the network device. This is not limited in this embodiment of the present invention.

At 540, the terminal device determines a target CTU group from the $2^N$ CTU groups according to a number of the current contention access period and the implicit portion.

Figure 7:
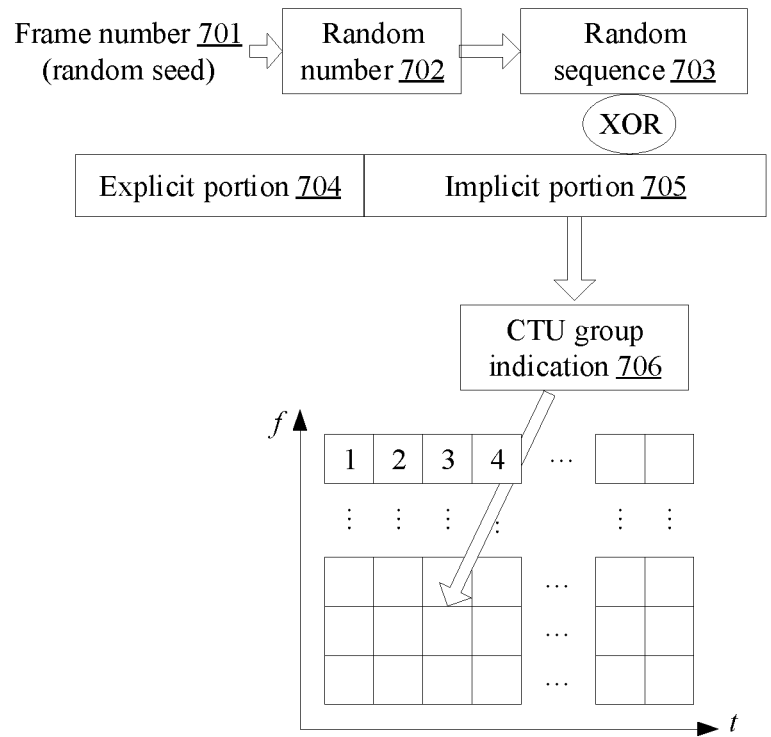
FIG. 7 is a schematic diagram of the data transmission method shown in FIG. 6.

Specifically, as shown in FIG. 7, assuming that a contention access period is specifically a radio frame, the terminal device may generate an N-bit binary pseudo-random sequence 703 (also referred to as X) by using a frame number 701 of a current frame as a seed to generate random number 702, and perform an exclusive OR operation expressed by an equation (1) on the binary pseudo-random sequence 703 and the implicit portion 705 (also referred to as Y), to obtain a CTU group indication 706 (also referred to as binary sequence Z). Then, the terminal device may determine, according to the correspondence between a CTU group number and a binary sequence, a target CTU group number corresponding to the binary sequence Z, where the correspondence is predefined, or preconfigured by the network device.

$$Z = X \oplus Y \quad (1)$$

where an operator $\oplus$ represents an exclusive OR (XOR) operation.

At 550, the terminal device determines a target CTU from at least one CTU included in the target CTU group.

Specifically, the terminal device may determine some or all CTUs in the target CTU group as the target CTUs. In one embodiment, the terminal device may randomly select the target CTU, or determine the target CTU according to some bits in the first partial identifier or in the second partial identifier. This way, a probability that multiple terminal devices select a same target CTU can be reduced, and data transmission performance can be improved.

At 560, the terminal device sends, to the network device by using the target CTU, an uplink data packet carrying the explicit portion.

At 570, the network device receives the uplink data packet sent by the terminal device, and may determine, by using a reverse process of the foregoing processing process performed by the terminal device, the implicit portion corresponding to the uplink data packet.

Specifically, the network device may determine a target CTU group in which a target CTU corresponding to the uplink data packet belongs, determine, according to the correspondence between a CTU group number and a binary sequence, the binary sequence Z corresponding to the CTU group number, and generate an N-bit binary pseudo-random sequence X' by using the number of the current contention access period as a seed. In this case, because the seed used by the network device to generate a random number is the same as that used by the terminal device, X'=X. The network device performs an exclusive OR operation shown in an equation (2) on the binary sequence Z obtained according to the target CTU group number and the binary sequence X' generated according to the number of the current contention access period, to obtain the implicit portion Y.

$$Z \oplus X' = X \oplus Y \oplus X = Y \quad (2)$$

At 580, the network device obtains, by using a rule same as that used by the terminal device, according to the explicit portion carried in the uplink data packet and the implicit portion, the complete terminal device identifier corresponding to the uplink data packet.

Figure 8:
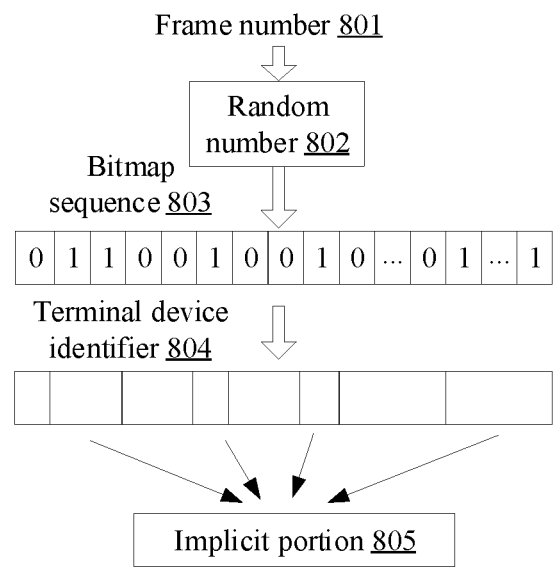
FIG. 8 is a schematic diagram of dividing a terminal device identifier in the data transmission method shown in FIG. 6.

FIG. 8 shows a specific implementation example of block 530 in FIG. 6. The terminal device may generate a binary (or bitmap) sequence 803 (also referred to as R) with a length of M by using a frame number 801 of a current contention access period as a seed to generate random number 802. A quantity of is in the binary sequence R is N. Then, the terminal device may collect, by using R as a bitmap sequence, numerical values on bits in the terminal device identifier that are corresponding to positions of 1 in R, to form a new binary sequence Y with a length of N, and use Y as implicit portion 805. Correspondingly, the terminal device may further collect the remaining portion of the terminal device identifier to form a new binary sequence with a length of (M−N), that is, an explicit portion (e.g., explicit portion 704 of FIG. 7).

As an example, assuming that the terminal device identifier of the terminal device is ID=[10011101], M=8, and N=3. The terminal device may generate a random sequence R=[01010001] according to the number of the current contention access period. Positions of 1s in R are 2, 4, and 8 from left to right. The terminal device may collect bits in the $2^{nd}$, $4^{th}$, and $8^{th}$ positions in the terminal device identifier ID to obtain the implicit portion Y=[011], and collect bits in the remaining positions to obtain an explicit portion [10110]. Y may be corresponding to a CTU group number 3, and the terminal device may select, from the multiple CTU groups, a target CTU group that is numbered 3. Then, the terminal device may transmit uplink data and the explicit portion [10110] of the terminal device identifier by using some CTUs or all CTUs in the target CTU group.

After receiving the uplink data and the explicit portion of the terminal device identifier that are transmitted by the terminal device, the network device may determine, according to the number 3 of the CTU group in which the uplink data belongs, the implicit portion Y of the terminal device identifier, and restore, according to the number of the current contention access period, the random sequence R in a manner the same as that used by the terminal device. Finally, the network device may sequentially insert all bits of the implicit portion Y=[011] into the explicit portion [10110], so that the bits of the implicit portion are located in the $2^{nd}$, $4^{th}$, and $8^{th}$ positions of the terminal device identifier, respectively. In this way, the complete terminal device identifier ID=[1011101] is restored.

Figure 9:
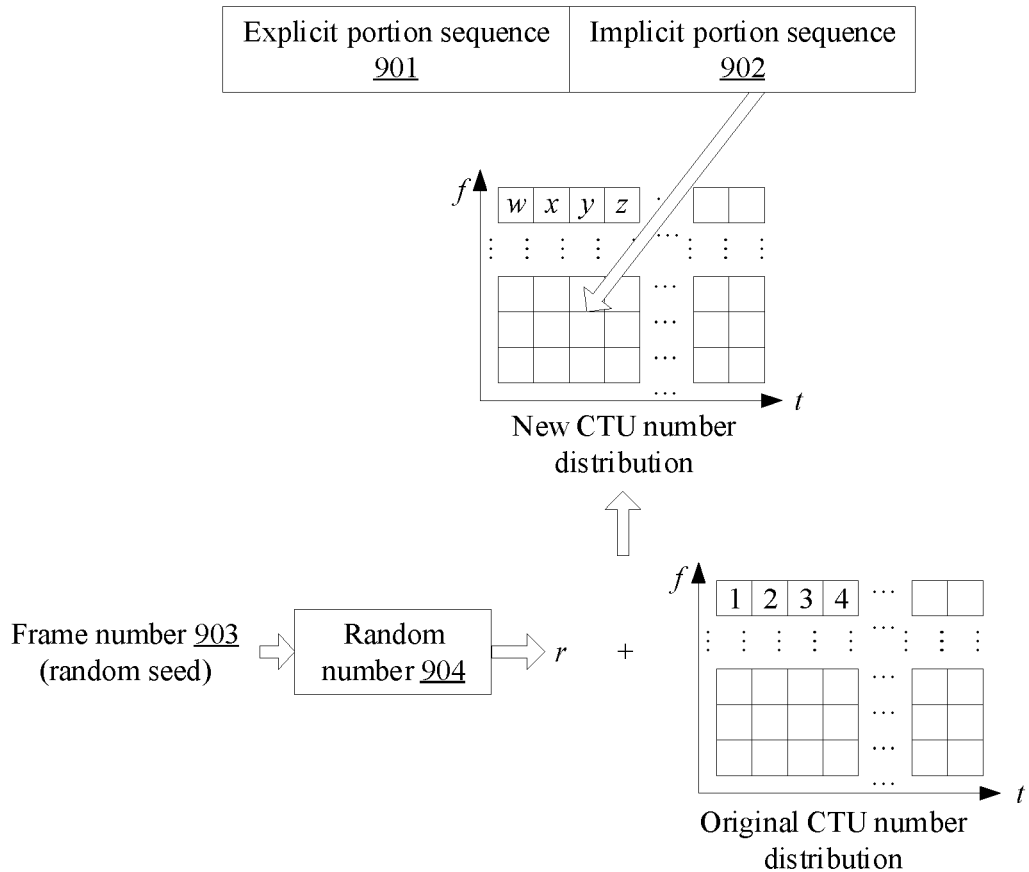
FIG. 9 is a schematic diagram of another data transmission method according to an embodiment of the invention.

FIG. 9 is a schematic flowchart of another data transmission method according to an embodiment of the present invention. Specifically, the terminal device may first generate a pseudo-random number 904 by using a frame number 903 of a current contention access period (for example, a frame number of a radio frame) as a seed, and perform cyclic shift on initial numbers of multiple CTU groups in the current contention access period according to the random number 904 to obtain new numbers of the multiple CTU groups. In addition, the terminal device may divide a terminal device identifier into an explicit portion sequence 901 and an implicit portion sequence 902, and determine, according to a correspondence between a sequence and a CTU group number, a target CTU group whose new number is corresponding to the implicit portion sequence 902.

It should be noted that the examples in FIG. 6 to FIG. 9 are merely intended to help a person skilled in the art better understand the embodiments of the present invention, but not to limit the scope of the embodiments of the present invention. Obviously, a person skilled in the art can make various equivalent modifications or variations according to the examples in FIG. 6 to FIG. 9, and such modifications and variations shall also fall within the scope of the embodiments of the present invention.

It should be understood that sequence numbers of the foregoing processes do not mean execution sequences. The execution sequences of the processes should be determined according to functions and internal logic of the processes, and should not be construed as any limitation on the implementation processes of the embodiments of the present invention.

The foregoing describes in detail the data transmission method according to the embodiments of the present invention with reference to FIG. 1 to FIG. 9. The following describes a data transmission apparatus according to an embodiment of the present invention with reference to FIG. 10 to FIG. 13.

Figure 10:
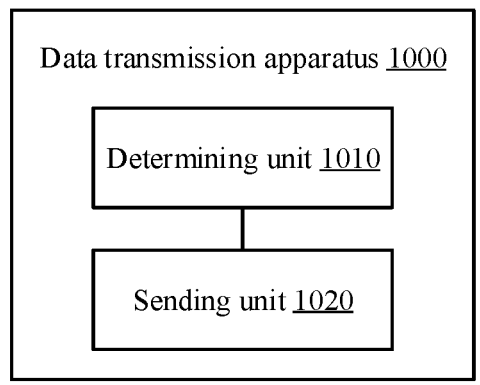
FIG. 10 is a schematic block diagram of a data transmission apparatus according to an embodiment of the invention.

FIG. 10 is a schematic block diagram of a data transmission apparatus 1000 according to an embodiment of the present invention. The apparatus 1000 may be a terminal device (e.g., terminal device 104-114 of FIG. 1). However, this is not limited in this embodiment of the present invention. As shown in FIG. 10, the apparatus 1000 includes a determining unit 610 configured to determine a target CTU from multiple candidate CTUs according to a first partial identifier in a terminal device identifier, where the terminal device identifier includes the first partial identifier and a second partial identifier. The apparatus 1000 further includes a sending unit 1020 configured to send an uplink data packet to a network device by using the target CTU determined by the determining unit 1010, where the uplink data packet carries the second partial identifier.

In one embodiment, the determining unit 1010 includes a first determining subunit configured to determine a target CTU group from multiple candidate CTU groups according to the first partial identifier, where each of the multiple candidate CTU groups includes at least one of the multiple candidate CTUs. The determining unit 1010 further includes a second determining subunit configured to determine the target CTU from at least one candidate CTU included in the target CTU group determined by the first determining subunit.

In another embodiment, the apparatus 1000 further includes a number changing unit configured to change initial numbers of the multiple candidate CTU groups according to a number of a contention access period in which the multiple candidate CTU groups belong before the first determining subunit determines the target CTU group from the multiple candidate CTU groups, to obtain new numbers of the multiple candidate CTU groups.

Correspondingly, the first determining subunit is configured to determine, according to the first partial identifier, a target CTU group number from multiple CTU group numbers corresponding to the multiple candidate CTU groups, and determine, from the multiple candidate CTU groups, a candidate CTU group whose new number is the target CTU group number as the target CTU group.

In another embodiment, a quantity of the multiple candidate CTU groups is $2^N$, where N≥1, and there is a one-to-one correspondence between $2^N$ CTU group numbers of the multiple candidate CTU groups and $2^N$ binary sequences with a length of N.

In another embodiment, the first determining subunit is configured to determine the target CTU group from the multiple candidate CTU groups according to the first partial identifier and the number of the contention access period in which the multiple candidate CTU groups belong.

In another embodiment, the first determining subunit is configured to generate a binary pseudo-random sequence according to the number of the contention access period, where a length of the binary pseudo-random sequence is the same as a length of the first partial identifier, perform a reversible operation on the binary pseudo-random sequence and the first partial identifier to obtain a first binary sequence, and determine the target CTU group from the multiple candidate CTU groups according to the first binary sequence.

In another embodiment, the apparatus 1000 further includes an identifier dividing unit configured to divide the terminal device identifier into the first partial identifier and the second partial identifier according to a number of a contention access period in which the multiple candidate CTUs belong before the determining unit 1010 determines the target CTU from the multiple candidate CTUs.

In another embodiment, the identifier dividing unit is configured to generate a second binary sequence with a length of M according to the number of the contention access period, where the second binary sequence includes N reference bits with a value of 1, M is a length of the terminal device identifier, N is the length of the first partial identifier, and 1≤N<M, sequentially arrange N bits in the terminal device identifier whose positions are respectively corresponding to the N reference bits, to form the first partial identifier, and sequentially arrange (M−N) bits in the terminal device identifier other than the N bits, to form the second partial identifier.

In another embodiment, the sending unit 1020 is configured to send, by using the target CTU determined by the determining unit 1010, the uplink data packet to the network device in a grant-free transmission mode.

The data transmission apparatus 1000 according to this embodiment of the present invention may be corresponding to the terminal device in the data transmission method according to the embodiments of the present invention, and the foregoing and other operations and/or functions of each module in the data transmission apparatus 1000 are intended to implement corresponding processes of each method in FIG. 3 to FIG. 9. For brevity, details are not further described herein.

Therefore, according to the data transmission apparatus provided in this embodiment of the present invention, the terminal device identifier is divided into the first partial identifier and the second partial identifier, the target CTU is determined from the multiple candidate CTUs according to the first partial identifier, and the uplink data packet carrying the second partial identifier is sent by using the target CTU, so that the first partial identifier in the terminal device identifier can be implicitly indicated. Compared with that the uplink data packet carries the complete terminal device identifier, this solution can reduce system signaling overheads and improve system performance.

Figure 11:
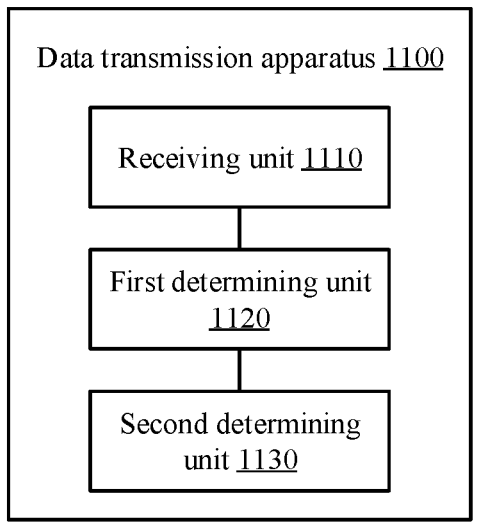
FIG. 11 is a schematic block diagram of another data transmission apparatus according to an embodiment of the invention.

FIG. 11 is a schematic block diagram of another data transmission apparatus 1100 according to an embodiment of the present invention. The apparatus 1100 may be a network device (e.g., network device 102 of FIG. 1). However, this is not limited in this embodiment of the present invention. As shown in FIG. 11, the apparatus 1100 includes a receiving unit 1110 configured to receive an uplink data packet transmitted by a terminal device by using a target CTU, where the uplink data packet carries a second partial identifier in a terminal device identifier of the terminal device, a first determining unit 1120 configured to determine a first partial identifier in the terminal device identifier according to the target CTU, where the terminal device identifier includes the first partial identifier and the second partial identifier, and a second determining unit 1130 configured to determine the terminal device identifier of the terminal device according to the first partial identifier determined by the first determining unit 720 and the second partial identifier.

In one embodiment, the first determining unit 1120 includes a first determining subunit configured to determine, according to CTU group information, a target CTU group in which the target CTU belongs, and a second determining subunit configured to determine the first partial identifier according to the target CTU group determined by the first determining subunit.

In another embodiment, the second determining subunit is configured to change an initial number of the target CTU group to obtain a new number of the target CTU group, and determine the first partial identifier according to the new number of the target CTU group.

In another embodiment, the second determining subunit is configured to determine the first partial identifier according to the target CTU group and a number of a contention access period in which the target CTU belongs.

In another embodiment, the second determining subunit is configured to determine, according to a correspondence between a CTU group number and a binary sequence with a length of N, a first binary sequence corresponding to the target CTU group, where N>1, generate a binary pseudorandom sequence with a length of N according to the number of the contention access period, and perform a reversible operation on the first binary sequence and the binary pseudorandom sequence to obtain the first partial identifier.

In another embodiment, the second determining unit 1130 is configured to sequentially combine the first partial identifier and the second partial identifier, to obtain the terminal device identifier of the terminal device.

In another embodiment, a length of the terminal device identifier is M, and a length of the first partial identifier is N, where $1 \leq N < M$. Correspondingly, the second determining unit 1130 is configured to generate a binary random sequence with a length of M according to the number of the contention access period in which the target CTU belongs, where the binary random sequence includes N reference bits with a value of 1, and insert the first partial identifier into the second partial identifier to obtain the terminal device identifier, so that positions of N bits in the first partial identifier in the terminal device identifier are in a one-to-one correspondence with positions of the N reference bits in the binary random sequence.

In another embodiment, the receiving unit 1110 is configured to receive the uplink data packet transmitted by the terminal device in a grant-free transmission mode by using the target CTU.

The data transmission apparatus 1100 according to this embodiment of the present invention may be corresponding to the network device in the data transmission method according to the embodiments of the present invention, and the foregoing and other operations and/or functions of each module in the data transmission apparatus 1100 are intended to implement corresponding processes of each method in FIG. 5 to FIG. 9. For brevity, details are not further described herein.

Therefore, according to the data transmission apparatus provided in this embodiment of the present invention, the terminal device identifier is divided into the first partial identifier and the second partial identifier, the target CTU is determined from the multiple candidate CTUs according to the first partial identifier, and the uplink data packet carrying the second partial identifier is sent by using the target CTU, so that the first partial identifier in the terminal device identifier can be implicitly indicated. The network device may determine the first partial identifier according to the target CTU, and further determine the complete terminal device identifier of the terminal device. Compared with that the uplink data packet carries the complete terminal device identifier, this solution can reduce system signaling overheads and improve system performance.

Figure 12:
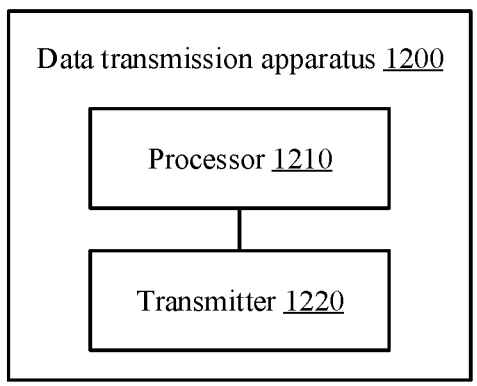
FIG. 12 is a schematic block diagram of another data transmission apparatus according to an embodiment of the invention.

FIG. 12 is a schematic block diagram of another data transmission apparatus 1200 according to an embodiment of the present invention. The apparatus 1200 may be a terminal device (e.g., terminal device 104-114 of FIG. 1). However, this is not limited in this embodiment of the present invention. As shown in FIG. 12, the apparatus 1200 includes a processor 1210 configured to determine a target CTU from multiple candidate CTUs according to a first partial identifier in a terminal device identifier, where the terminal device identifier includes the first partial identifier and a second partial identifier, and a transmitter 1220 configured to send an uplink data packet to a network device by using the target CTU determined by the processor 1210, where the uplink data packet carries the second partial identifier.

In this embodiment of the present invention, the processor may be a central processing unit (CPU), or the processor may be another general purpose processor, a digital signal processor (DSP), an application-specific integrated circuit (ASIC), a field programmable gate array (FPGA) or another programmable logical device, a discrete gate or transistor logical device, a discrete hardware assembly, or the like. The general purpose processor may be a microprocessor, the processor may be any conventional processor, or the like.

In one embodiment, the apparatus 1200 may further include a memory, and the memory may include a read-only memory and a random access memory and provide an instruction and data to the processor. A part of the memory may further include a non-volatile random access memory. For example, the memory may further store device type information.

In an implementation process, all steps of the foregoing methods may be completed by using an integrated logic circuit of hardware in the processor or by using an instruction in a software form. The steps of the methods disclosed with reference to the embodiments of the present invention may be directly implemented by a hardware processor, or may be implemented by a combination of hardware and a software module in a processor. The software module may be located in a storage medium mature in the art, such as a random access memory, a flash memory, a read-only memory, a programmable read-only memory, an electrically erasable programmable memory, or a register. The storage medium is located in the memory. The processor reads an instruction in the memory and completes the steps of the foregoing methods with reference to hardware in the processor. To avoid repetition, details are not further described herein.

In one embodiment, the processor 1210 is configured to determine a target CTU group from multiple candidate CTU groups according to the first partial identifier, where each of the multiple candidate CTU groups includes at least one of the multiple candidate CTUs, and determine the target CTU from at least one candidate CTU included in the target CTU group.

In another embodiment, the processor 1210 is further configured to change initial numbers of the multiple candidate CTU groups according to a number of a contention access period in which the multiple candidate CTU groups belong before determining the target CTU group from the multiple candidate CTU groups, to obtain new numbers of the multiple candidate CTU groups, and determine, according to the first partial identifier, a target CTU group number from multiple CTU group numbers corresponding to the multiple candidate CTU groups, and determine, from the multiple candidate CTU groups, a candidate CTU group whose new number is the target CTU group number as the target CTU group.

In another embodiment, a quantity of the multiple candidate CTU groups is $2^N$, where N≥1, and there is a one-to-one correspondence between $2^N$ CTU group numbers of the multiple candidate CTU groups and $2^N$ binary sequences with a length of N.

In another embodiment, the processor 1210 is configured to determine the target CTU group from the multiple candidate CTU groups according to the first partial identifier and the number of the contention access period in which the multiple candidate CTU groups belong.

In another embodiment, the processor 1210 is configured to generate a binary pseudo-random sequence according to the number of the contention access period, where a length of the binary pseudo-random sequence is the same as a length of the first partial identifier, perform a reversible operation on the binary pseudo-random sequence and the first partial identifier to obtain a first binary sequence, and determine the target CTU group from the multiple candidate CTU groups according to the first binary sequence.

In another embodiment, the processor 1210 is further configured to divide the terminal device identifier into the first partial identifier and the second partial identifier according to a number of a contention access period in which the multiple candidate CTUs belong before determining the target CTU from the multiple candidate CTUs.

In another embodiment, the processor 1210 is configured to generate a second binary sequence with a length of M according to the number of the contention access period, where the second binary sequence includes N reference bits with a value of 1, M is a length of the terminal device identifier, N is the length of the first partial identifier, and 1≤N<M, sequentially arrange N bits in the terminal device identifier whose positions are respectively corresponding to the N reference bits, to form the first partial identifier, and sequentially arrange (M−N) bits in the terminal device identifier other than the N bits, to form the second partial identifier.

In another embodiment, the transmitter 1220 is configured to send, by using the target CTU determined by the processor 1210, the uplink data packet to the network device in a grant-free transmission mode.

The data transmission apparatus 1200 according to this embodiment of the present invention may be corresponding to the terminal device in the data transmission method according to the embodiments of the present invention, and the foregoing and other operations and/or functions of each module in the data transmission apparatus 1200 are intended to implement corresponding processes of each method in FIG. 3 to FIG. 9. For brevity, details are not further described herein.

Therefore, according to the data transmission apparatus provided in this embodiment of the present invention, the terminal device identifier is divided into the first partial identifier and the second partial identifier, the target CTU is determined from the multiple candidate CTUs according to the first partial identifier, and the uplink data packet carrying the second partial identifier is sent by using the target CTU, so that the first partial identifier in the terminal device identifier can be implicitly indicated. Compared with that the uplink data packet carries the complete terminal device identifier, this solution can reduce system signaling overheads and improve system performance.

Figure 13:
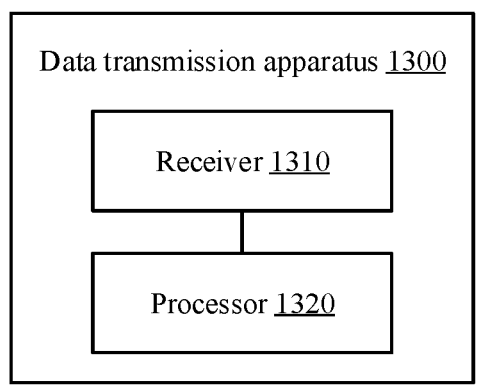
FIG. 13 is a schematic block diagram of another data transmission apparatus according to an embodiment of the invention.

FIG. 13 is a schematic block diagram of another data transmission apparatus 1300 according to an embodiment of the present invention. The apparatus 1300 may be a network device (e.g., network device 102 of FIG. 1). However, this is not limited in this embodiment of the present invention. As shown in FIG. 13, the apparatus 1300 includes a receiver 1310 configured to receive an uplink data packet transmitted by a terminal device by using a target CTU, where the uplink data packet carries a second partial identifier in a terminal device identifier of the terminal device, and a processor 1320 configured to determine a first partial identifier in the terminal device identifier according to the target CTU, where the terminal device identifier includes the first partial identifier and the second partial identifier, and determine the terminal device identifier of the terminal device according to the first partial identifier and the second partial identifier.

In this embodiment of the present invention, the processor may be a CPU, or the processor may be another general purpose processor, a digital signal processor (DSP), an application-specific integrated circuit (ASIC), a field programmable gate array (FPGA) or another programmable logical device, a discrete gate or transistor logical device, a discrete hardware assembly, or the like. The general purpose processor may be a microprocessor, the processor may be any conventional processor, or the like.

In one embodiment, the apparatus 1300 may further include a memory, and the memory may include a read-only memory and a random access memory and provide an instruction and data to the processor. A part of the memory may further include a non-volatile random access memory. For example, the memory may further store device type information.

In an implementation process, all steps of the foregoing methods may be completed by using an integrated logic circuit of hardware in the processor or by using an instruction in a software form. The steps of the methods disclosed with reference to the embodiments of the present invention may be directly implemented by a hardware processor, or may be implemented by a combination of hardware in a processor and a software module. The software module may be located in a storage medium mature in the art, such as a random access memory, a flash memory, a read-only memory, a programmable read-only memory, an electrically erasable programmable memory, or a register. The storage medium is located in the memory. The processor reads an instruction in the memory and completes the steps of the foregoing methods with reference to hardware in the processor. To avoid repetition, details are not further described herein.

In one embodiment, the processor 1320 is configured to determine, according to CTU group information, a target CTU group in which the target CTU belongs, and determine the first partial identifier according to the target CTU group.

In another embodiment, the processor 1320 is configured to change an initial number of the target CTU group to obtain a new number of the target CTU group, and determine the first partial identifier according to the new number of the target CTU group.

In another embodiment, the processor 1320 is configured to determine the first partial identifier according to the target CTU group and a number of a contention access period in which the target CTU belongs.

In another embodiment, the processor 1320 is configured to determine, according to a correspondence between a CTU group number and a binary sequence with a length of N, a first binary sequence corresponding to the target CTU group, where N>1, generate a binary pseudo-random sequence with a length of N according to the number of the contention access period, and perform a reversible operation on the first binary sequence and the binary pseudo-random sequence to obtain the first partial identifier.

In another embodiment, the processor 1320 is configured to sequentially combine the first partial identifier and the second partial identifier to obtain the terminal device identifier of the terminal device.

In another embodiment, a length of the terminal device identifier is M, and a length of the first partial identifier is N, where $1 \leq N < M$. Correspondingly, the processor 1320 is configured to generate a binary random sequence with a length of M according to the number of the contention access period in which the target CTU belongs, where the binary random sequence includes N reference bits with a value of 1, and insert the first partial identifier into the second partial identifier to obtain the terminal device identifier, so that positions of N bits in the first partial identifier in the terminal device identifier are in a one-to-one correspondence with positions of the N reference bits in the binary random sequence.

In another embodiment, the receiver 1310 is configured to receive the uplink data packet transmitted by the terminal device in a grant-free transmission mode by using the target CTU.

The data transmission apparatus 1300 according to this embodiment of the present invention may be corresponding to the network device in the data transmission method according to the embodiments of the present invention, and the foregoing and other operations and/or functions of each module in the data transmission apparatus 1300 are intended to implement corresponding processes of each method in FIG. 5 to FIG. 9. For brevity, details are not further described herein.

Therefore, according to the data transmission apparatus provided in this embodiment of the present invention, the terminal device identifier is divided into the first partial identifier and the second partial identifier, the target CTU is determined from the multiple candidate CTUs according to the first partial identifier, and the uplink data packet carrying the second partial identifier is sent by using the target CTU, so that the first partial identifier in the terminal device identifier can be implicitly indicated. The network device may determine the first partial identifier according to the target CTU, and further determine the complete terminal device identifier of the terminal device. Compared with that the uplink data packet carries the complete terminal device identifier, this solution can reduce system signaling overheads and improve system performance.

It should be understood that, the term "and/or" in the embodiments of the present invention describes only an association relationship for describing associated objects and represents that three relationships may exist. For example, A and/or B may represent the following three cases: Only A exists, both A and B exist, or only B exists. In addition, the character "/" in this specification generally indicates an "or" relationship between the associated objects.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be indirect couplings or communication connections between some interfaces, apparatuses, and units, or may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The computer software product is stored in a storage medium and includes several instructions for instructing a computer device (which may be a personal computer, a server, a network device, or the like) to perform all or a part of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data transmission method, comprising:

determining by a terminal device a target contention transmission unit (CTU) from a plurality of candidate CTUs according to a first partial identifier in a terminal device identifier, wherein the terminal device identifier comprises the first partial identifier and a second partial identifier; and sending by the terminal device an uplink data packet to a network device by using the target CTU, wherein the uplink data packet carries the second partial identifier;

wherein determining the target CTU from the plurality of candidate CTUs according to the first partial identifier in the terminal device identifier comprises:

determining by the terminal device a target CTU group from a plurality of candidate CTU groups according to the first partial identifier, wherein each of the plurality of candidate CTU groups comprises at least one of the plurality of candidate CTUs, wherein determining the target CTU group from the plurality of candidate CTU groups comprises:

generating by the terminal device a binary pseudo-random sequence according to a number of contention access period in which the plurality of candidate CTU groups belong, wherein a length of the binary pseudo-random sequence is the same as a length of the first partial identifier, performing by the terminal device a reversible operation on the binary pseudo-random sequence and the first partial identifier to obtain a first binary sequence, and determining by the terminal device the target CTU group from the plurality of candidate CTU groups according to the first binary sequence.

2. The method according to claim 1, wherein determining the target CTU from the plurality of candidate CTUs according to the first partial identifier in the terminal device identifier further comprises:

determining by the terminal device the target CTU from at least one candidate CTU comprised in the target CTU group.

3. The method according to claim 1, further comprising: prior to determining the target CTU from the plurality of candidate CTUs, dividing by the terminal device the terminal device identifier into the first partial identifier and the second partial identifier according to a number of contention access period in which the plurality of candidate CTUs belong.

4. The method according to claim 3, wherein dividing the terminal device identifier into the first partial identifier and the second partial identifier according to the number of contention access period in which the plurality of candidate CTUs belong comprises:

generating by the terminal device a second binary sequence with a length of M according to the number of contention access period, wherein the second binary sequence comprises N reference bits with a value of 1, wherein M is a length of the terminal device identifier, N is the length of the first partial identifier, and 1≤N<M, sequentially arranging by the terminal device N bits in the terminal device identifier whose positions are respectively corresponding to the N reference bits to form the first partial identifier, and sequentially arranging by the terminal device (M−N) bits in the terminal device identifier other than the N bits to form the second partial identifier.

5. A data transmission method, comprising:

receiving by a network device an uplink data packet transmitted by a terminal device by using a target contention transmission unit (CTU), wherein the uplink data packet carries a second partial identifier in a terminal device identifier of the terminal device;

determining by the network device a first partial identifier in the terminal device identifier according to the target CTU, wherein the terminal device identifier comprises the first partial identifier and the second partial identifier; and determining by the network device the terminal device identifier of the terminal device according to the first partial identifier and the second partial identifier by:

generating by the network device a binary random sequence with a length of M according to a number of contention access period in which the target CTU belongs, wherein the binary random sequence comprises N reference bits with a value of 1, and inserting by the network device the first partial identifier into the second partial identifier to obtain the terminal device identifier, so that positions of N bits in the first partial identifier in the terminal device identifier are in a one-to-one correspondence with positions of the N reference bits in the binary random sequence.

6. The method according to claim 5, wherein determining the first partial identifier in the terminal device identifier according to the target CTU comprises:

determining by the network device, according to CTU group information, a target CTU group in which the target CTU belongs, and determining by the network device the first partial identifier according to the target CTU group.

7. The method according to claim 6, wherein determining the first partial identifier according to the target CTU group is further according to the number of contention access period in which the target CTU belongs.

8. The method according to claim 5, wherein a length of the terminal device identifier is M, and a length of the first partial identifier is N, wherein 1≤N<M.

9. A data transmission apparatus, comprising:

a processor configured to determine a target contention transmission unit (CTU) from a plurality of candidate CTUs according to a first partial identifier in a terminal device identifier, wherein the terminal device identifier comprises the first partial identifier and a second partial identifier, and to determine a target CTU group from a plurality of candidate CTU groups according to the first partial identifier, wherein each of the plurality of candidate CTU groups comprises at least one of the plurality of candidate CTUs; and a transmitter configured to send an uplink data packet to a network device by using the target CTU determined by the determining unit, wherein the uplink data packet carries the second partial identifier;

wherein to determine the target CTU group from the plurality of candidate CTU groups, the processor is further configured to:

generate a binary pseudo-random sequence according to a number of contention access period in which the plurality of candidate CTU groups belong, wherein a length of the binary pseudo-random sequence is the same as a length of the first partial identifier, perform a reversible operation on the binary pseudo-random sequence and the first partial identifier to obtain a first binary sequence, and determine the target CTU group from the plurality of candidate CTU groups according to the first binary sequence.

10. The apparatus according to claim 9, wherein the processor is further configured to:

determine the target CTU from at least one candidate CTU comprised in the target CTU group determined by a first determining subunit.

11. The apparatus according to claims 9, wherein the processor is further configured to:

prior to determining the target CTU from the plurality of candidate CTUs, divide the terminal device identifier into the first partial identifier and the second partial identifier according to a number of contention access period in which the plurality of candidate CTUs belong.

12. The apparatus according to claim 11, wherein the processor is further configured to:

generate a second binary sequence with a length of M according to the number of contention access period, wherein the second binary sequence comprises N reference bits with a value of 1, wherein M is a length of the terminal device identifier, N is the length of the first partial identifier, and $1 \leq N < M$, sequentially arrange N bits in the terminal device identifier whose positions are respectively corresponding to the N reference bits to form the first partial identifier, and sequentially arrange (M−N) bits in the terminal device identifier other than the N bits to form the second partial identifier.

13. A data transmission apparatus, comprising:

a receiver configured to receive an uplink data packet transmitted by a terminal device by using a target contention transmission unit (CTU), wherein the uplink data packet carries a second partial identifier in a terminal device identifier of the terminal device; and a processor configured to:

determine a first partial identifier in the terminal device identifier according to the target CTU, wherein the terminal device identifier comprises the first partial identifier and the second partial identifier, and determine the terminal device identifier of the terminal device according to the first partial identifier determined by the first determining unit and the second partial identifier by:

generating a binary random sequence with a length of M according to a number of contention access period in which the target CTU belongs, wherein the binary random sequence comprises N reference bits with a value of 1, and inserting the first partial identifier into the second partial identifier to obtain the terminal device identifier, so that positions of N bits in the first partial identifier in the terminal device identifier are in a one-to-one correspondence with positions of the N reference bits in the binary random sequence.

14. The apparatus according to claim 13, wherein the processor is further configured to:

determine, according to CTU group information, a target CTU group in which the target CTU belongs, and determine the first partial identifier according to the target CTU group determined by a first determining subunit.

15. The apparatus according to claim 14, wherein the processor is further configured to determine the first partial identifier according to the target CTU group and the number of contention access period in which the target CTU belongs.

16. The apparatus according to claim 13, wherein a length of the terminal device identifier is M, and a length of the first partial identifier is N, wherein $1 \leq N < M$, the processor is further configured to:

generate a binary random sequence with a length of M according to the number of contention access period in which the target CTU belongs, wherein the binary random sequence comprises N reference bits with a value of 1, and insert the first partial identifier into the second partial identifier to obtain the terminal device identifier, so that positions of N bits in the first partial identifier in the terminal device identifier are in a one-to-one correspondence with positions of the N reference bits in the binary random sequence.

* * * * *